United States Patent

Sasaki et al.

[11] Patent Number: 5,861,462
[45] Date of Patent: Jan. 19, 1999

[54] METHOD FOR FORMING A LIQUID CRYSTAL RESIN COMPOSITE

[75] Inventors: Keita Sasaki, Hiroshima; Masatoshi Shinomori, Hatsukaichi, both of Japan

[73] Assignee: Mazda Motor Corporation, Hiroshima-ken, Japan

[21] Appl. No.: 953,667

[22] Filed: Sep. 30, 1992

[30] Foreign Application Priority Data

Sep. 30, 1991 [JP] Japan .................................. 3-252223

[51] Int. Cl.$^6$ ........................... C08L 67/00; C08L 77/00; C08L 77/12; C08L 71/12
[52] U.S. Cl. ............................... 525/64; 525/66; 525/67; 525/167; 525/177; 525/392; 525/397; 525/425; 525/432; 525/439; 525/444; 525/935
[58] Field of Search .................................. 525/64, 66, 67, 525/167, 177, 392, 397, 425, 432, 439, 444, 935

[56] References Cited

U.S. PATENT DOCUMENTS

| | | | |
|---|---|---|---|
| 4,433,118 | 2/1984 | Schwartz et al. | 525/437 |
| 4,728,698 | 3/1988 | Isayev et al. | 525/439 |
| 5,225,489 | 7/1993 | Provorsek et al. | 525/151 |
| 5,260,380 | 11/1993 | Isayev | 525/177 |
| 5,268,225 | 12/1993 | Isayev | 428/294 |
| 5,395,470 | 3/1995 | Toh et al. | 156/244.11 |

FOREIGN PATENT DOCUMENTS 0340655  11/1989  European Pat. Off. .
1-320128  12/1989  Japan .

*Primary Examiner*—Ana Woodward
*Attorney, Agent, or Firm*—Morrison & Foerster

[57] ABSTRACT

The present invention relates to a method for forming the LCP composite having LCP fibers dispersed in the matrix resin even if the LCP content may be smaller than the lower limit of the fiber formable range.

The method is characterized in that a resin composite reinforced by the LCP fiber in a mixture ratio beyond the fiber formable range or the preferred fiber formable range by means of an extrusion or injection molding of a resin mixture containing a liquid crystal resin composite extruded in the fiber formable range or the preferred fiber formable range.

15 Claims, 20 Drawing Sheets

METHOD FOR FORMING A LIQUID CRYSTAL RESIN COMPOSITE

BACKGROUND OF THE INVENTION

1. (Field of the Invention)

The present invention relates to a method for forming a liquid crystal resin or polymer composite, more particularly to a method suitable for forming a resin composite reinforced by the liquid crystal resin fiber which content is even in a lower ratio of the liquid crystal resin to the matrix resin.

2. (Description of the Prior Art)

Recently, there have been problems with the recycling of fiber reinforced plastic (FRP) composite which comprises a thermosetting resin or thermoplastic resin as a matrix resin and glass or carbon fibers as a reinforcement material to be mixed thereto. Therefore, there is proposed the liquid crystal resin composite as a substitute of FRP (see Japanese Patent Tokkaihei 1-320128 and etc.).

However, the liquid crystal resin (hereinafter referred to as LCP) is expensive, so that the composite thereof becomes expensive. Therefore, if the LCP does not make it possible to give an improved construction strength to the resultant composite by a small amount thereof, the production becomes too expensive for such a material to be a substitute for a conventional FRP material.

The LCP composite is generally prepared by steps comprising a step for heating the LCP and the thermoplastic matrix resin to a temperature above a melted point thereof (c range of FIG. 1), a step for mixing them uniformly in their melting state and a step for extruding the mixture into a desired shape at a formable temperature of the matrix resin below the melting point of the LCP (b range of FIG. 1). The composite thus obtained comprises the LCP fibers oriented in the extruding direction in the matrix resin and provides a predetermined physical property. As a result of our studies of the formation of the LCP composite, however, the fiber formable range of the LCP is limited and changes depending on nature of the matrix resin to be mixed therewith as shown in FIG. 2. A lower limit of the fiber formable range is defined by a fiber deformable range while an upper limit thereof is defined by a phase reversible range and thus the middle range between the fiber deformable range and the phase reversible range is defined as the fiber formable range. The phase reversal means a change from L phase dispersed in M phase type to M phase dispersed in L phase type and vice versa wherein L is liquid crystal phase and M is matrix resin phase. The fiber formable range means a range wherein the LCP in the matrix resin formed according to the present invention comes to have a fiber shape having an aspect ratio of more than 3.

Therefore, it is sometimes found that the LCP can not be fiber-formed and can not provides a desired physical property if a designed composite product contains an amount of LCP in the matrix resin which is in the lower end of the content range because the LCP content is sometimes out of the fiber formable range.

An object of the present invention is to provide a method for forming the LCP composite having LCP fibers dispersed in the matrix resin even if the LCP content may be smaller than the lower limit of the fiber formable range.

SUMMARY OF THE INVENTION

According to a first aspect of the present invention, there is provided a method for forming a liquid crystal resin composite comprising a thermoplastic resin as a matrix resin and a liquid crystal resin having liquid crystal transition temperature higher than a formable temperature or melting point of the thermoplastic resin as a reinforcement material, which comprises the following steps:

a step for mixing the liquid crystal resin to the thermoplastic resin in a manner to have a mixture ratio belonging to a fiber formable range or a preferred fiber formable range below the phase reversible range, a step for melt-extruding the mixture at the formable temperature of the matrix resin higher than the liquid crystal transition temperature to give a formable composite raw material having fibers of the liquid crystal resin, a step for forming a liquid crystal resin composite product from a mixture comprising a matrix resin and the formable composite raw material in a mixture ratio below the fiber formable range or the preferred fiber formable range.

In the present invention, as the liquid crystal resin component, a composite comprising a high content of the LCP resin in the matrix resin may be added in place of pure LCP.

In the case of reforming a used LCP composite having a low content of liquid crystal resin below the fiber formable range or the preferred fiber formable range according to the above method, it is necessary to blend a fresh LCP with the used LCP composite in a manner to have a mixture ratio belonging to the fiber formable range or the preferred fiber formable range. Therefore, according to a second aspect of the present invention, there is provided to a method for reforming a LCP composite having a LCP of the content below the fiber formable range or the preferred fiber formable range, which comprises the following steps:

a step for blending a used LCP composite with a predetermined amount of the LCP in a manner to have a mixture ratio belonging to the fiber formable range or the preferred fiber formable range, a step for melt-extruding the mixture at the formable temperature or melting point of the matrix resin higher than the liquid crystal transition temperature to give a formable composite raw material having LCP fibers therein, and a step for forming a liquid crystal resin composite product from a mixture in a mixture ratio below the fiber formable range or the preferred fiber formable range comprising a matrix resin and the formable composite raw material.

A fiber formable range and the preferred fiber formable range of the LCP depend on the kind and nature of the matrix resin. For example, in the case of using a polyamide matrix resin such as Nylon, it ranges preferably from 50 to 70 weight % based on the weight of the composite as shown in FIGS. 4 and 5. In the case of using a ABS (acrylnitryl-butadiene-styrene copolymer) matrix resin, it preferably ranges from 40 to 70 weight % as shown in FIGS. 6 and 7. The lower limits of their ranges are relatively higher.

On the other hand, in the case of using a polycarbonate (PC)/ABS resin as the matrix resin, the fiber formable range may range from 3 to 70 weight %. In the case of using a PPO/PA6 (polyphenyleneoxide/nylon) matrix resin, it may range from 2 to 65 weight %. In the case of using a modified PPO(polyphenyleneoxide) matrix resin, it may range from 3 to 60 weight %. In the case of using a PP (polypropylene) matrix resin, it may range from 2 to 75 weight %. In the case of using a PC (polycarbonate) matrix resin, it may range from 3 to 70 wt. %. Their ranges extend widely from a low content to a high content, but near or at the lower limit, most of the LCP may be formed to a granular shape having less than 3 of the aspect ratio. Therefore, even in the latter cases, the melt-extruding for fiber forming the LCP had better be carried in a higher content range of the LCP. In the latter cases, therefore, the preferred range may be selected within said fiber formable range from the viewpoint or the resulting properties such as a tensile strength and a flowing length ratio; in the case of the PC/ABS, 3 to 70 weight % is preferred as shown in FIGS. 8 and 9; in the case of the PPO/PA6, 20 to 65 weight % is preferred as shown in FIGS. 10 and 11; in the case of the modified PPO, 40 to 60 weight % is preferred as shown in FIGS. 12 and 13; in the case of the PP, 40 to 70 weight % is preferred as shown in FIGS. 14 and 15; in the case of the PC, 3 to 20 weight % is preferred as shown in FIG. 16; in the case of the PBT, 30 to 70 weight % is preferred as shown in FIGS. 17 and 18; in the case of the PC/PBT, 2 to 60 weight % is preferred as shown in FIGS. 19 and 20.

The ABS resins used in the present invention are not limited to ones having specific physical properties. Therefore, any commercially available ABS resins can be used as the matrix resin. Examples of the ABS resin include KRALASTIC MH (made by SUMITOMO DOW LTD.), CYCOLAC T (made by UBE CYCON LTD.) and GR-2000 (made by DENKI KAGAKU KOGYO KABUSHI KIKAISHA).

The polyamide resins used in the present invention are not limited to ones having specific physical properties. Therefore, any commercially available polyamide resin can be used as the matrix resin. Among them, Nylon-6 is preferable. Examples of the polyamide resin include 1013B (made by UBE INDUSTRIES, LTD.), CM1017 (made by TORAY INDUSTRIES, LTD.) and TECHNYL 216 (made by SHOWA DENKO K.K.).

The other matrix resins used in the present invention are also commercially available. That is, the PC/ABS resin is commercially available, for example TECHNIACE T-105 (made by Sumitomo Dow Co., Ltd.), T-2600 (made by Teijin Chemical Co., Ltd.), UBELLOY (made by Ube Cycon Co., Ltd.) and the like. The PP resin is commercialy available, for example H501 (made by Sumitomo Chemical Co., Ltd.), J440 (made by Mitsui Petrochemical Industries, Ltd.), H950H (made by Idemitsu Petrochemichal Co., Ltd.) and the like. The modified PPO resin, especially styrene-modified PPO resin is commercially available, for example NORYL PX 2623 (made by Japan GE Plastics Co., Ltd.), Iupiace AN-30 (made by Mitsubishi Gas Chemical Co., Inc.), ZXYLON X 5055 (made by Asahi Chemical Industry Co., Ltd.) and the like. The PC resin is commercially available, for example 141 (made by Japan GE Plastics Co., Ltd.), Panlight L1250 (made by Teijin Chemical Co., Ltd.), Iupilon S-1000 (made by Mitsubishi Gas Chemical Co., Ltd.) and the like. The PPO/PA6 resin is commercially available, for example NORYL GTX 6006 (available from Japan GE Plastics Co., Ltd.), Iupiace NX-7,000 (made by Mitsubishi Gas Chemical Co., Ltd.), and the like. The PBT resin is commercially available for 1401X07 (made by Toray Industries, Ltd.), TEIJIN PBT C7000 (made by Teijin Ltd.), Plastic BT-100 (made by Dai-nippon Ink Chemical Co., Ltd.) and the like. The PC/PBT resin is commercially available, for example XENOY 1101 (made by Japan GE Plastics Co., Ltd.), AM-9060 (made by Teijin Chemical Co., Ltd.) and the like.

The liquid crystal resin in the present invention is a reinforcement material uniformly dispersed in the matrix resin which comes to have the shape of fibers of the aspect ratio described below by the melt-extruding step of the present invention. The liquid crystal resin has a crystal transition point higher, preferably by 20° C. or more, than the formable temperature or melting point of the matrix resin. Because, if the transition point would be lower than the formable temperature of the matrix resin, the LCP does not form to a fiber shape in the resultant composite and even if it can be formed to a fiber shape, the orientation does not come to be constant, therefore resulting in insufficient strength of the LCP composite.

Examples of the LCP for use of the present invention includes any known ones as long as the above properties are provided and are not limited to specific ones. Among them, a thermoplastic liquid crystal polyester and a thermoplastic polyesteramide are preferable. More preferable examples are indicated below by the following chemical structures.

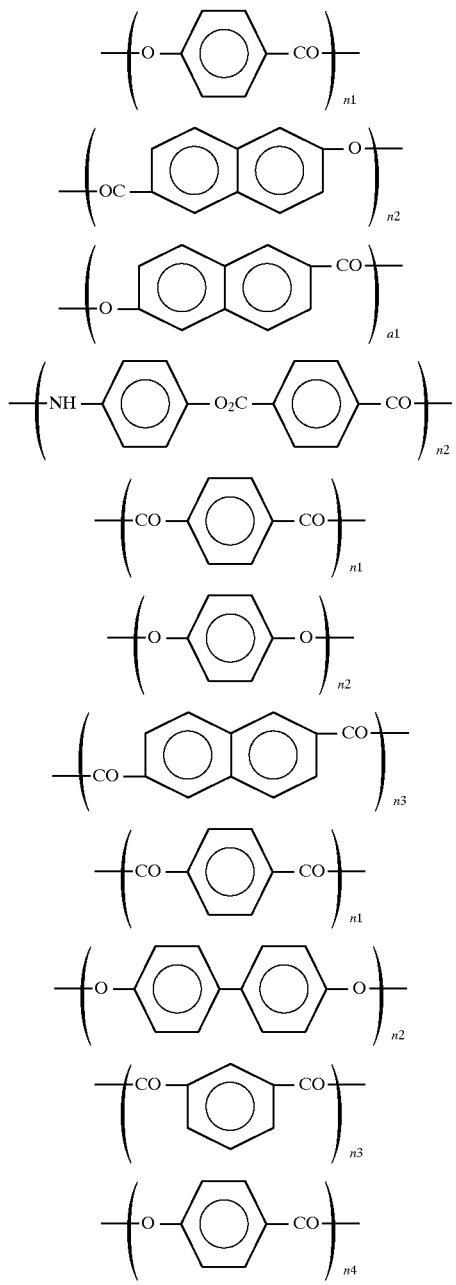

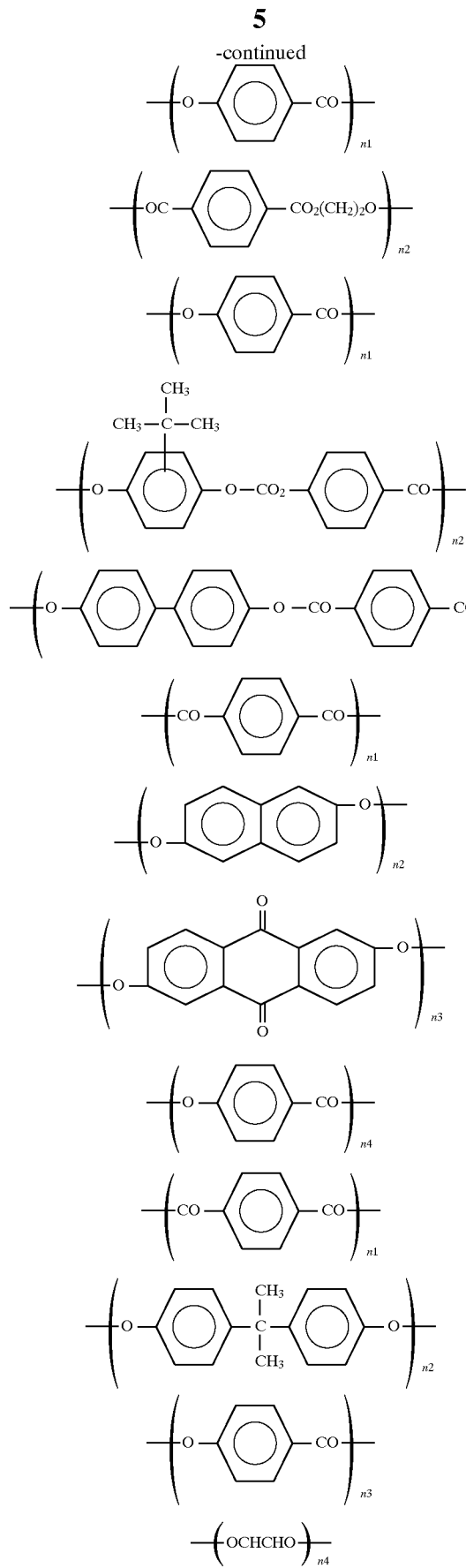

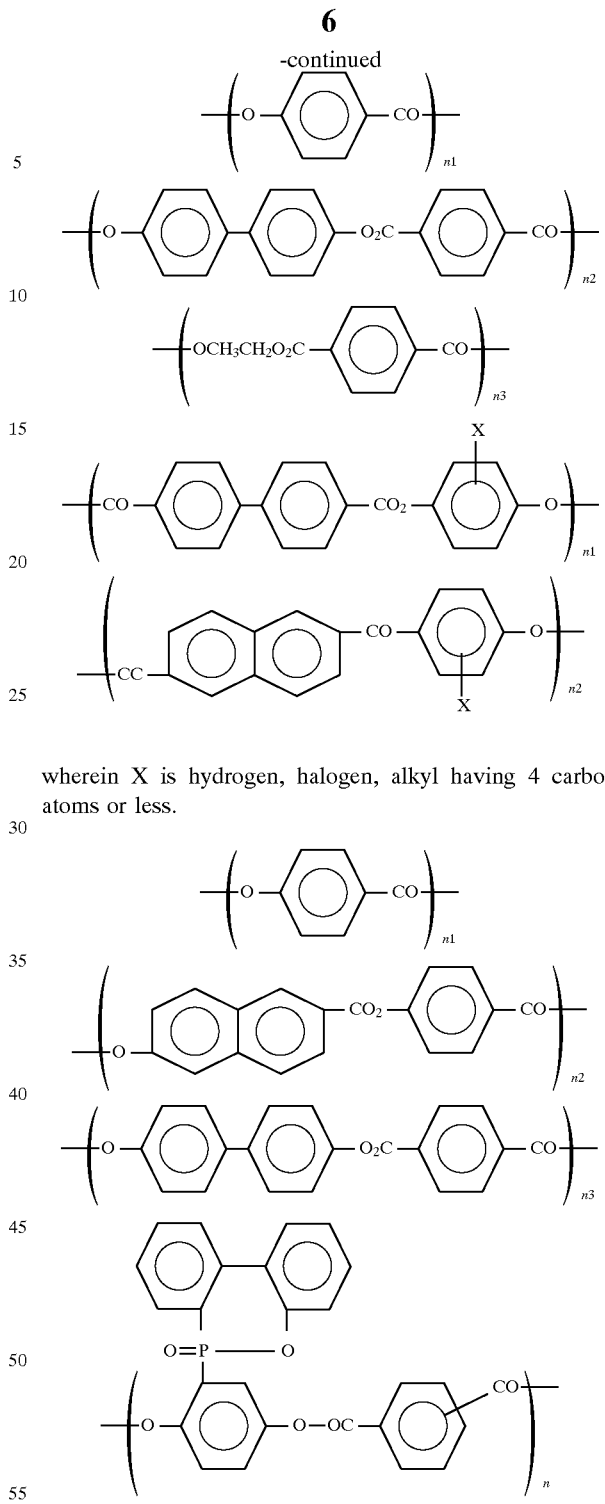

wherein X is hydrogen, halogen, alkyl having 4 carbon atoms or less.

wherein $\Sigma ni=100$, preferably ni of the chemical structure is more than 4.

In the formula, a variety of substitutent such as halogen may be added. The above LCP is suitable for the modified polyester resin because the mixture is easy to be molded under a melting condition and result in a composite fiber having a high strength and elastic modulus.

Similarly, any liquid crystal polyesteramide may be used without limitation. Particularly, the LCP represented by the following formula is preferable in the present invention.

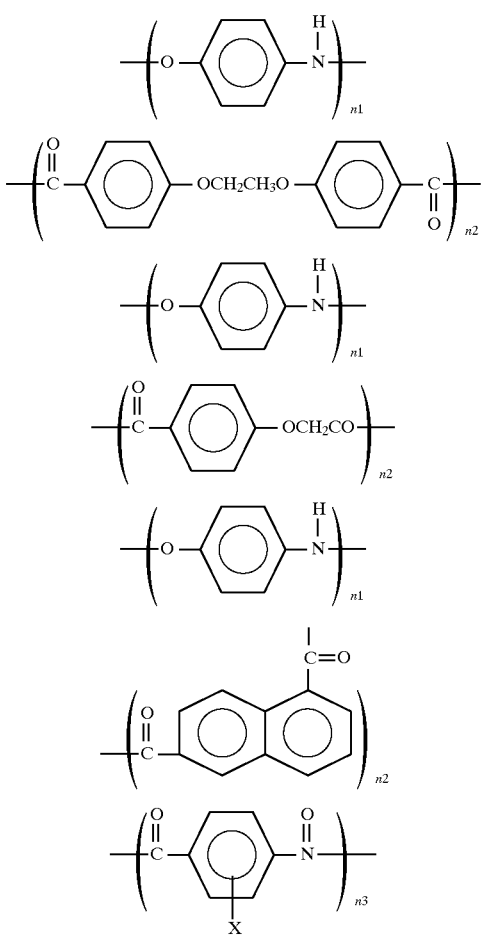

wherein X is hydrogen, halogen, alkyl having 4 carbon atoms or less.

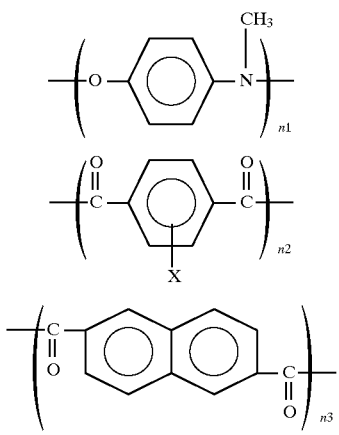

wherein X is hydrogen, halogen, alkyl having 4 carbon atoms or less.

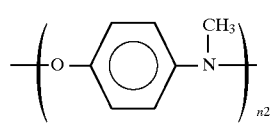

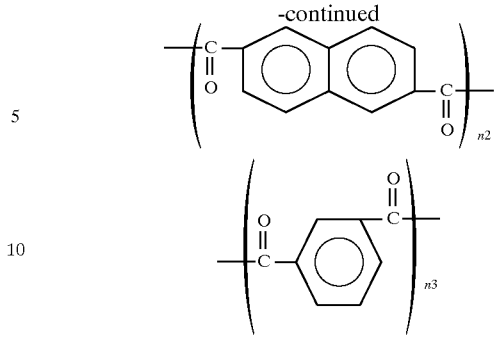

wherein $\Sigma ni=100$, preferably ni of the chemical structure is more than 15.

In the formula, a variety of substitutent such as halogen may be added. The above LCP is easy to be molded under a melting condition as similar to polyarylate liquid crystal resin and result in a fiber having a high strength.

The resin composition to be melt-extruded according to the present invention may contain a sunproofing agent, an antioxidant, a plasticizer and any other additive as long as it does not prevent the liquid crystal resin from forming a fiber. Among them, there may be added a compatibilizing agent which provides improved bonding power between the matrix phase and the LCP fiber phase, for example such compatibilizing agents include a matrix resin modified by a compound with epoxy groups and/or an acid anhydride in the case of using ABS resin, polystylene resin, polycarbonate resin, polyphenyleneoxide resin or polyolefin resin as a matrix resin and a compound having more than 2 of epoxy group, carboxyl group, oxazolynyl group or amino group in the case of using polyester resin, polyarylate resin or polyamide resin as a matrix resin.

According to the present invention, a resin composition containing the LCP of a suitable content for fiber formation in the matrix resin may be formed into a product or a formable raw material in a manner to provide the LCP with orientation property after heated to a transition temperature of the LCP and be made to a melting state. Such orientation can be generally provided by means of extrusion molding or injection molding. Therefore, a final product having the LCP fibers with high degree of orientation can be directly formed by the above method, but the final product may be formed through a formable raw material such as pellet having the LCP with high degree of orientation by means of melt-forming in an extruder or injector. The melt-forming temperature is preferably in a range from a formable temperature of the matrix resin to a transition temperature of the LCP because the original LCP fiber can be kept during the formation process so that the final product includes the LCP fibers in the matrix resin. The fiber of the LCP has an aspect ratio (length/diameter ratio) of 3 or more, preferably that of 10 or more. In the case of less than 3 of the aspect ratio, the product becomes not to be an anisotropic one and can not be provided with a sufficient strength in a oriented direction.

In order to produce the composite material or product including the LCP fibers having the aspect ratio of more than 3, a shear rate of the resin composition to be extruded is preferably in a range from $3 \times 10^2$ to $10^5$ $sec^{-1}$, more preferably from $3 \times 10^2$ to $10^4$ $sec^{-1}$. Further the resultant composite material may be subjected to a drawing treatment, because the drawing provides the LCP composite with an improved tensile strength over that of the LCP composite without the drawing treatment.

According to the present invention, even if the content of the LCP is not within the fiber formable range or the preferred fiber formable range, there can be provided a resin composite product with a desired physical property by mixing the LCP fiber contained composite and the matrix resin and dispersing the LCP fiber uniformly into the matrix resin.

Further, when a used LCP composite material is reused as shown in FIG. 3 and the used material does not contain a sufficient amount of the LCP to be formed in a fiber shape by melt-extruding, fresh LCP and if necessary, fresh matrix resin are added thereto in a manner to give the mixture to have a composition ratio within the fiber formable range or the preferred fiber formable range. The mixture is subjected to a melt-extruding process and further a drawing process after cooling, resulting in formation of the composite material wherein most or all of the LCP is fiber formed and is dispersed uniformly in the matrix resin. The formable composite material and a fresh plastic material are mixed in a mixture ratio below the fiber formable range or the preferred fiber formable range of the LCP and thereafter the mixture is subjected to a molding process such as an injection molding and so on, the fiber formed LCP is dispersed in a resultant product with a substantially original shape. Therefore, according to the present invention, the fiber formed LCP can be dispersed in the recycled product by a desired amount.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

Wherein, FIGS. 6 to 20 are the results under the substantially same condition as Example 1.

DETAILED DESCRIPTION OF THE EMBODIMENTS

Figure 1A:
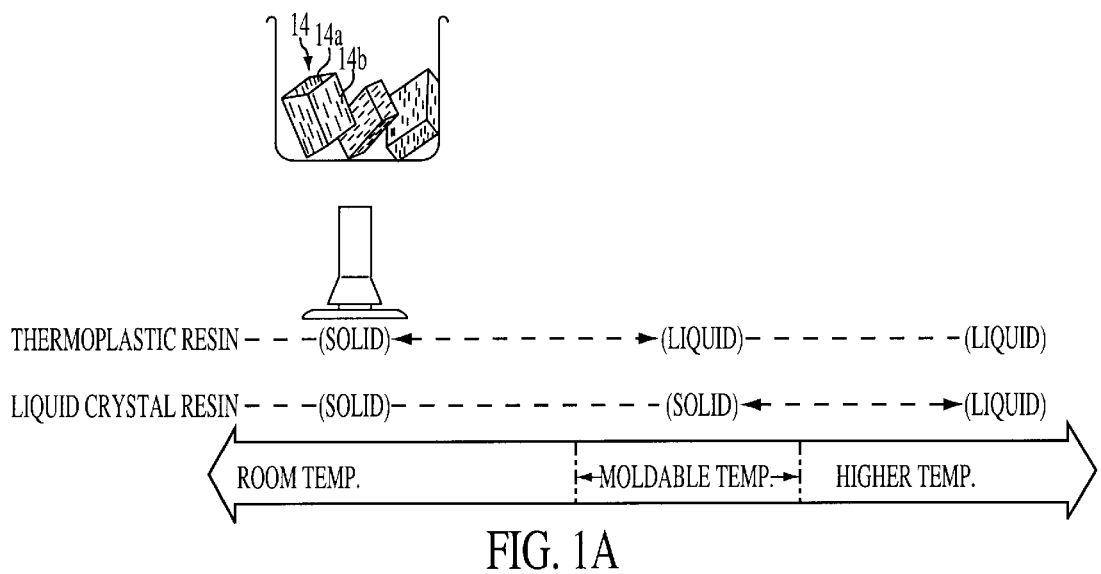
FIG. 1 is a schematic view illustrating a change of the thermoplastic resin and the LCP contained in the composite resin which is subjected to the higher temperature range, the middle formable temperature range and the room temperature range.
Figure 1B:
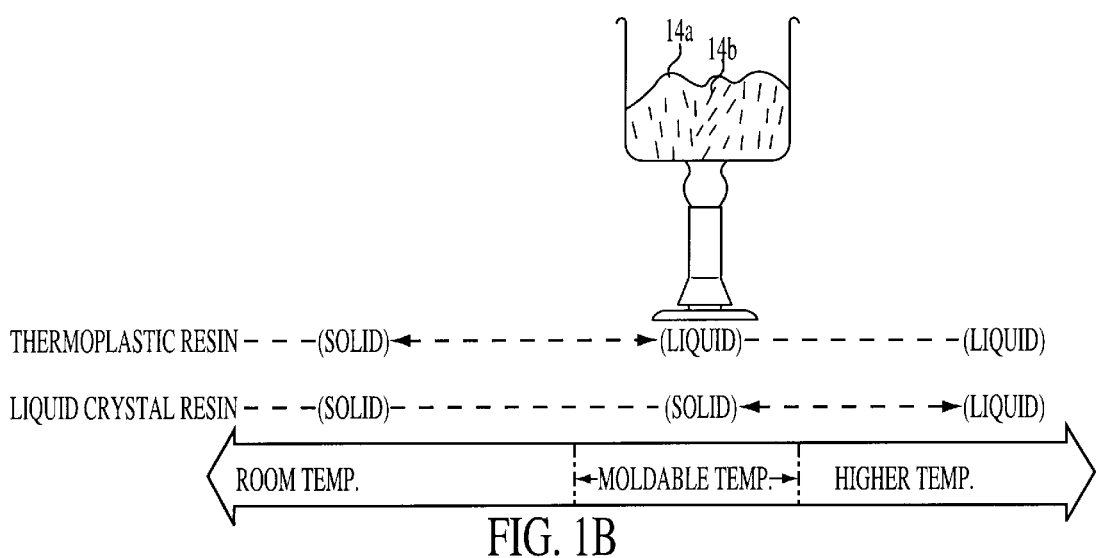
Figure 1C:
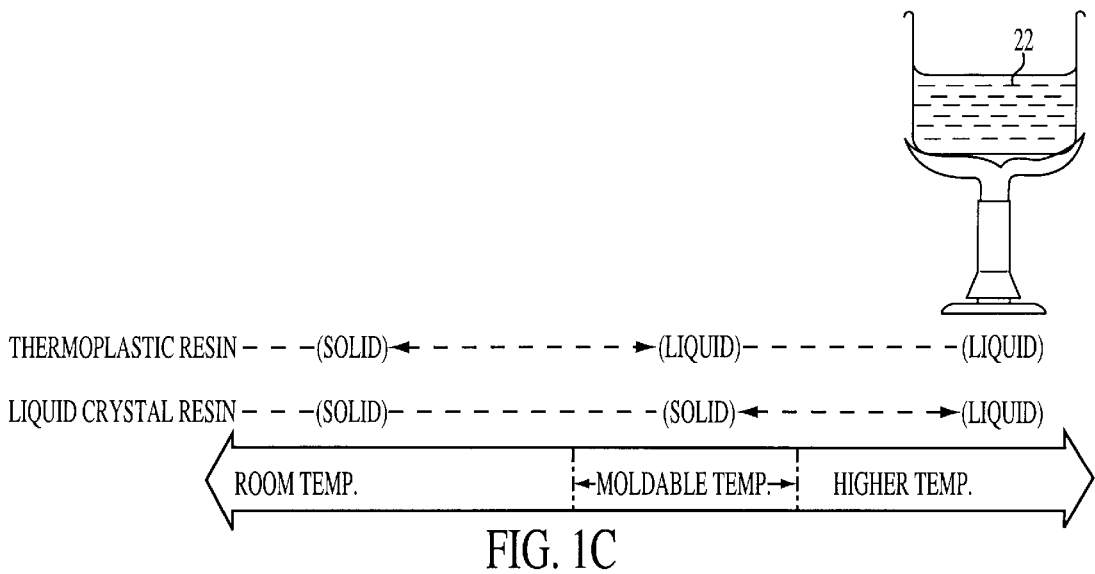
Figure 2:
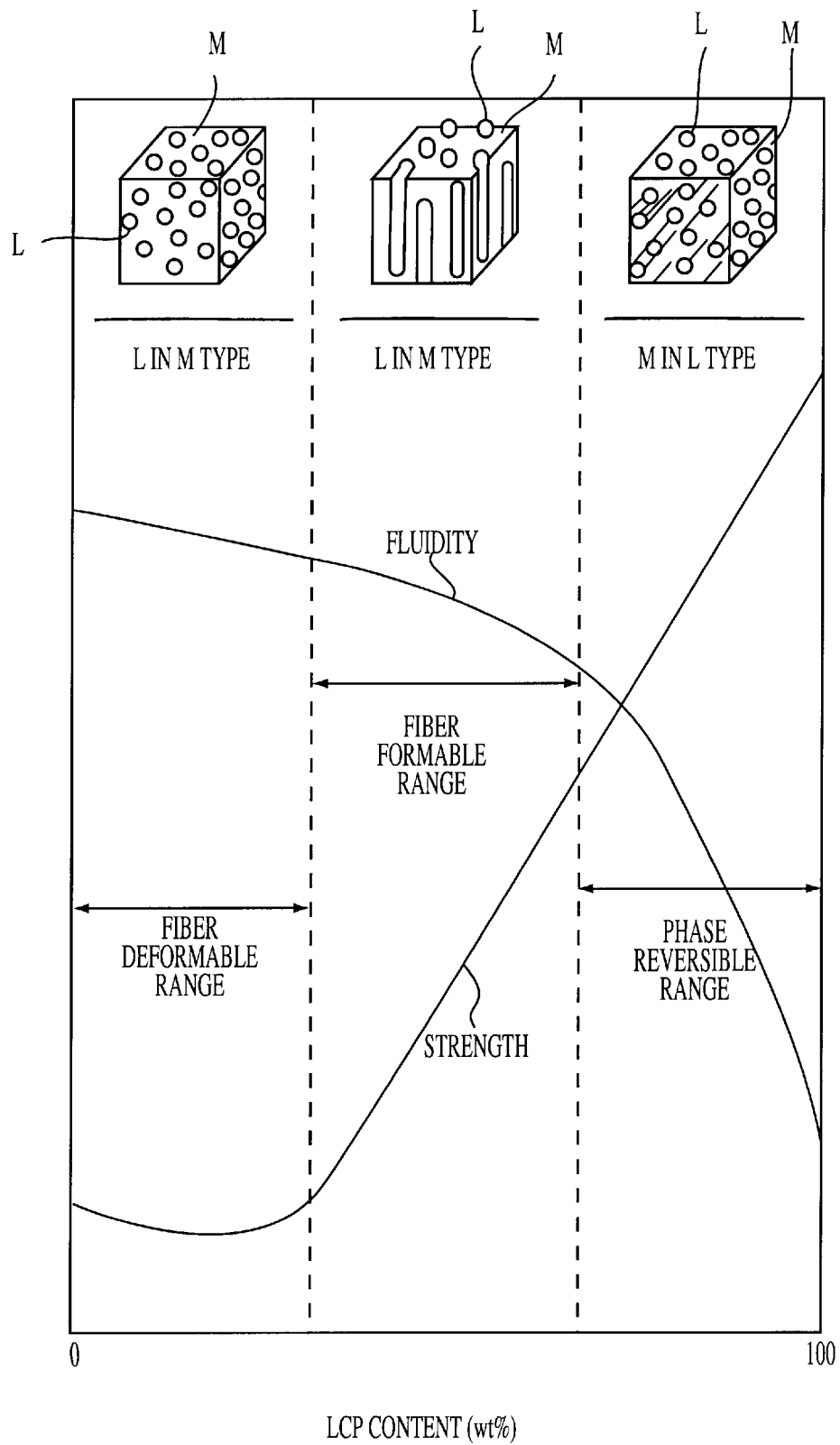
FIG. 2 is a change of the LCP state in the composite effected by the content of the LCP in the matrix resin.
Figure 3:
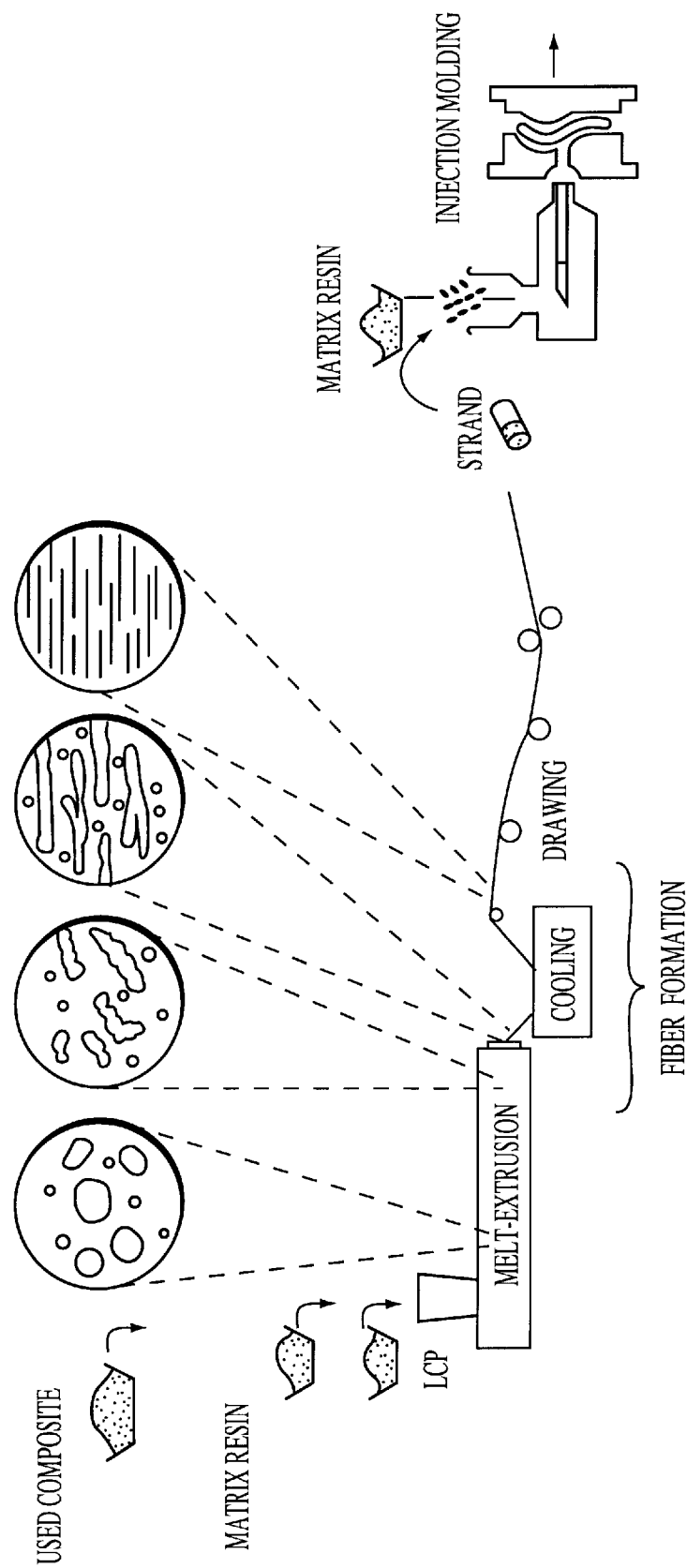
FIG. 3 is a schematic view illustrating the working steps of the molding of the composite resin in accordance with the embodiment of the present invention.
Figure 4:
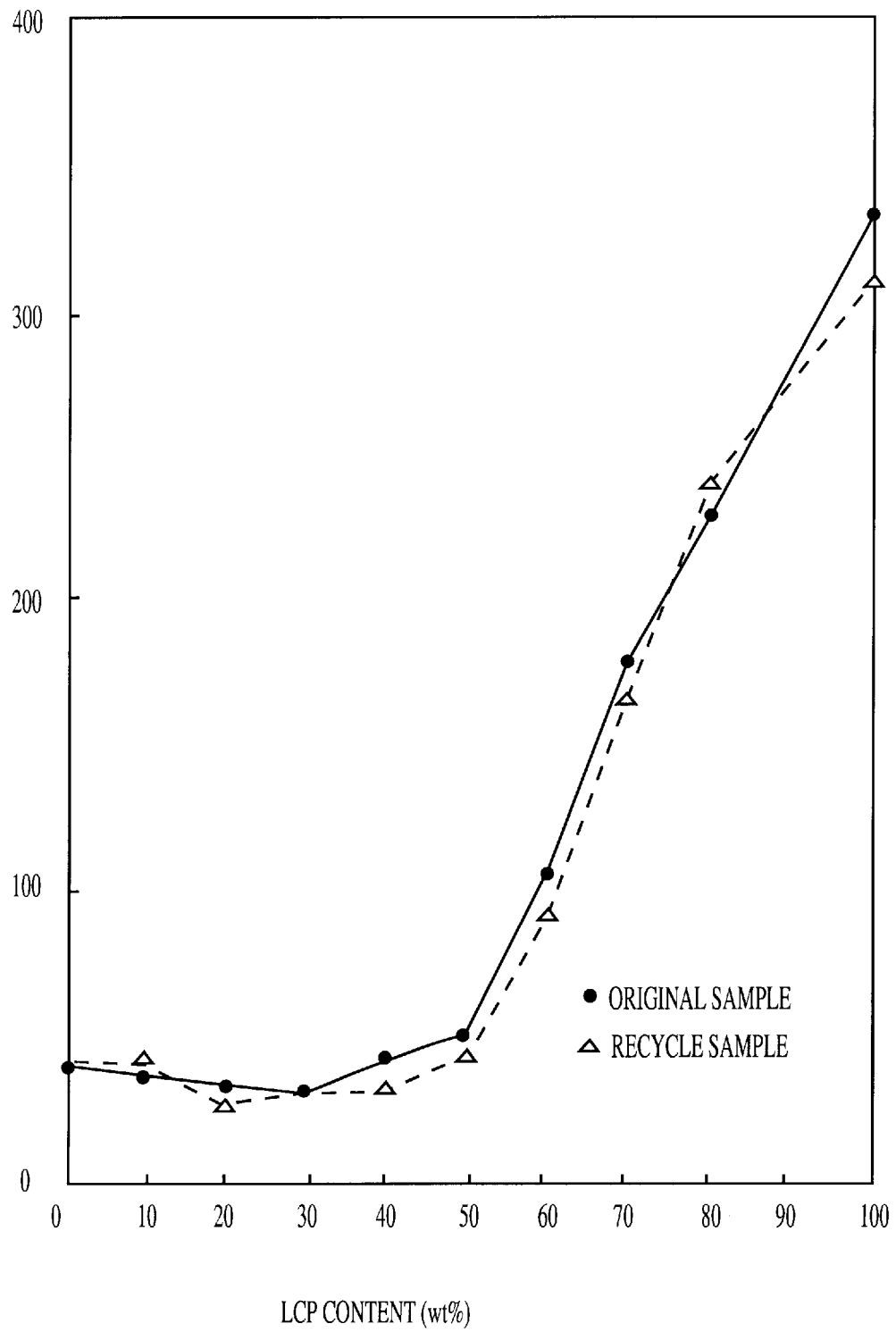
FIG. 4 is a graph showing a relationship between and amount(wt. %) of the liquid crystal polymer and a tensile strength of the original sample and the recycled sample in the case of Nylon-6(PA-6)
Figure 5:
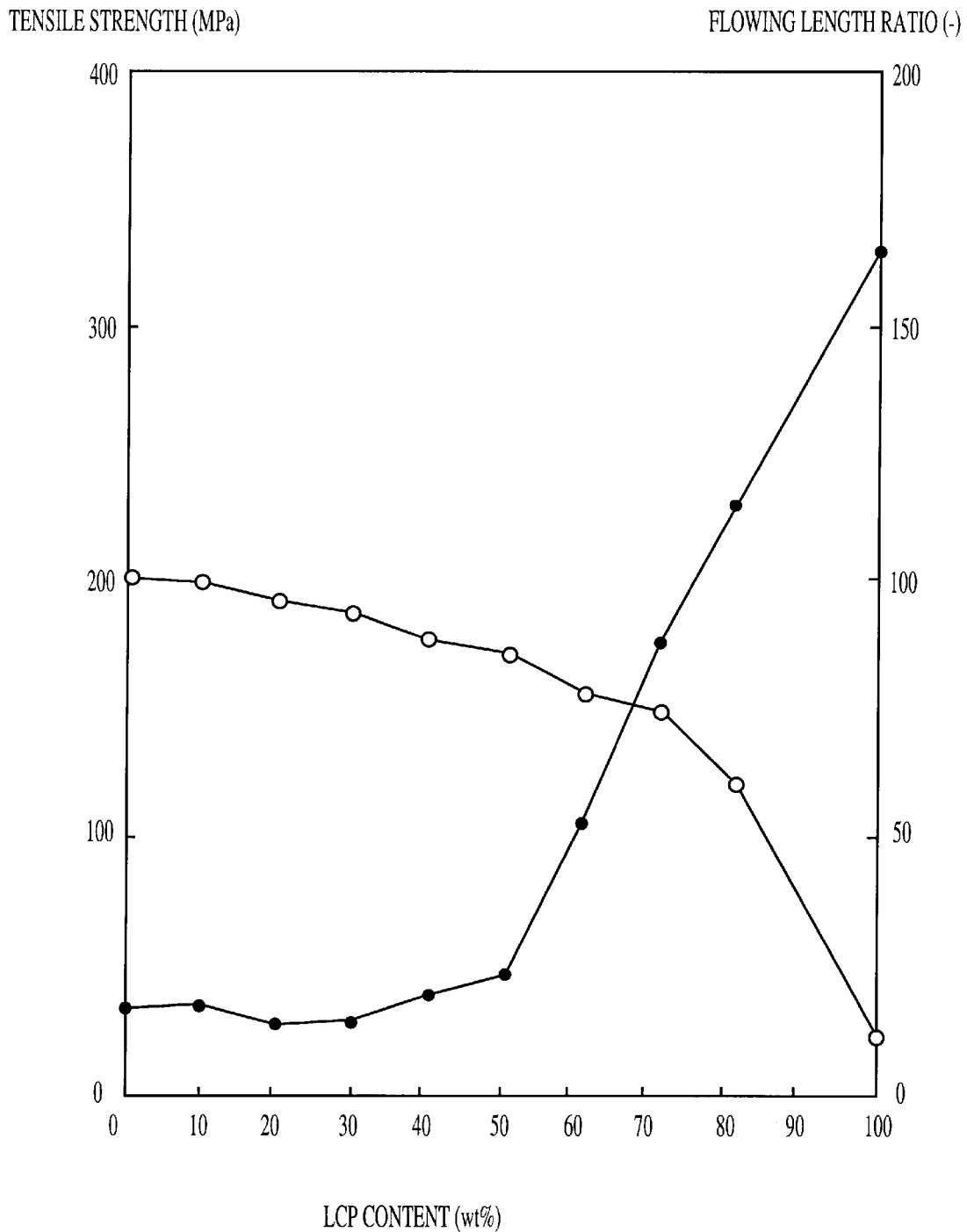
FIG. 5 is a graph showing a relationship between an amount(wt. %) of the liquid crystal polymer and a tensile strength and a flowing length ratio(-) in the case of PA-6.
Figure 6:
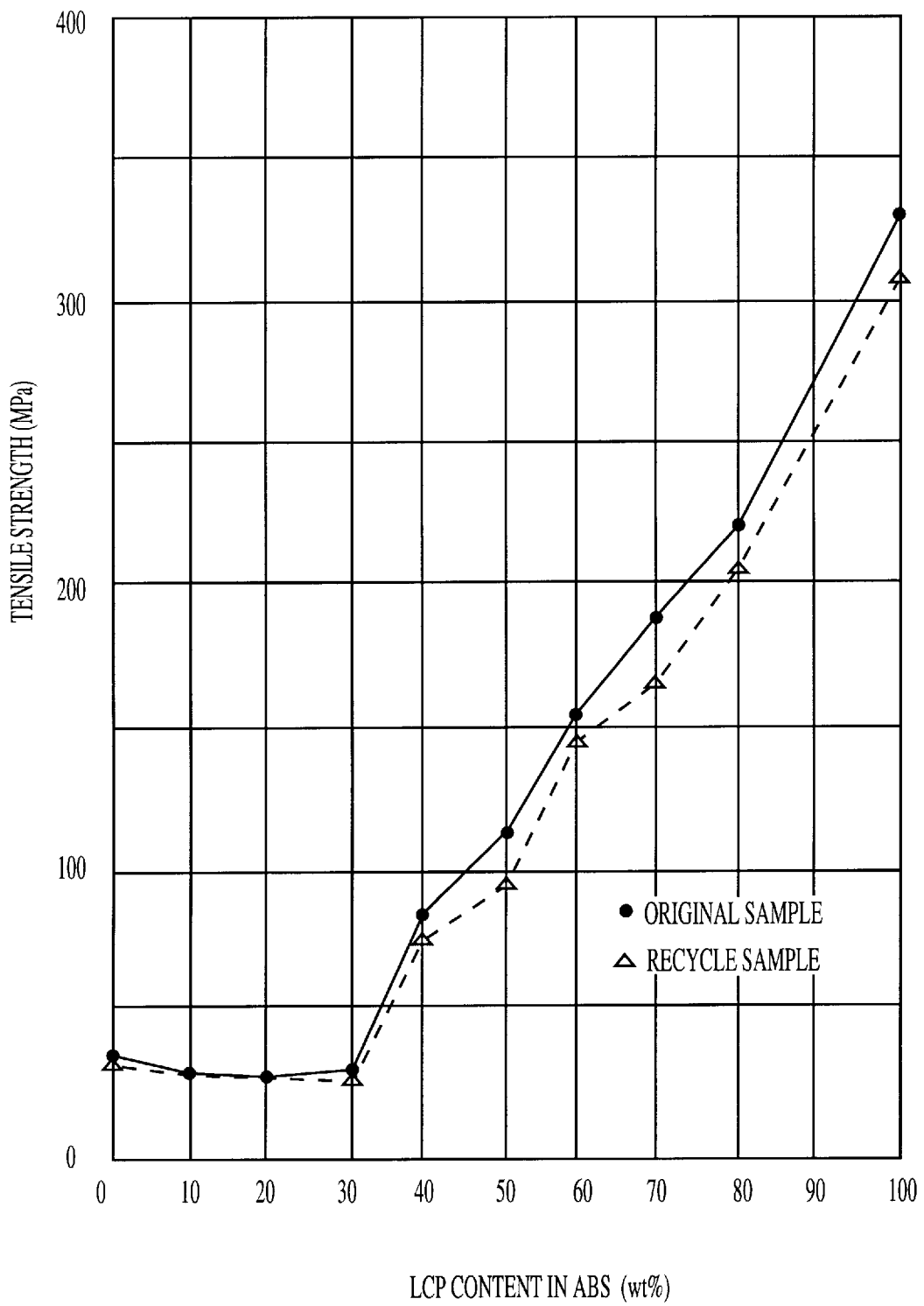
FIG. 6 is a graph showing a relationship between an amount(wt. %) of the liquid crystal polymer and a tensile strength of the original sample and the recycled sample in the case of ABS.
Figure 7:
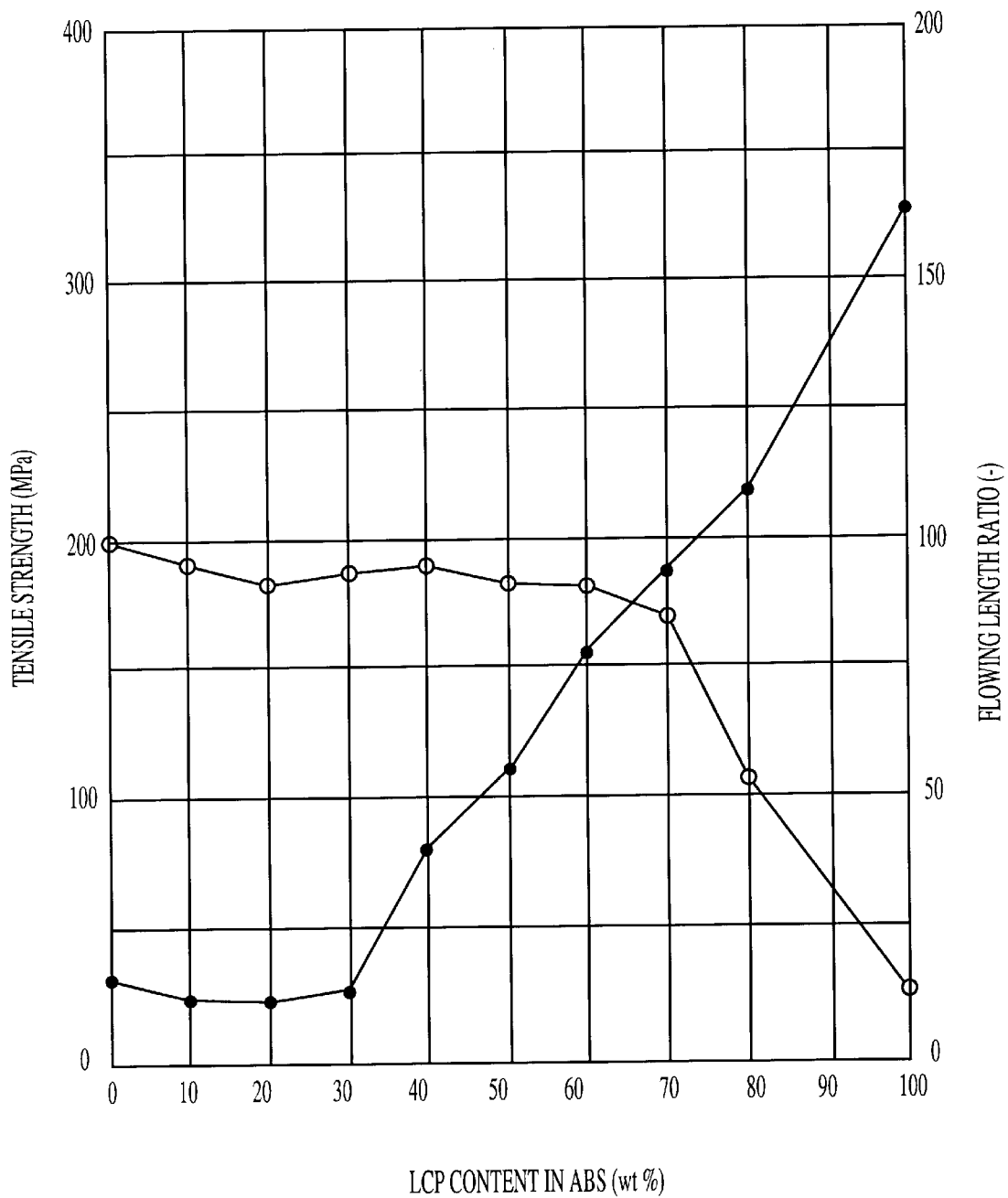
FIG. 7 is a graph showing a relationship between an amount(wt. %) of the liquid crystal polymer and a tensile strength and a flowing length ratio(-) in the case of ABS.
Figure 8:
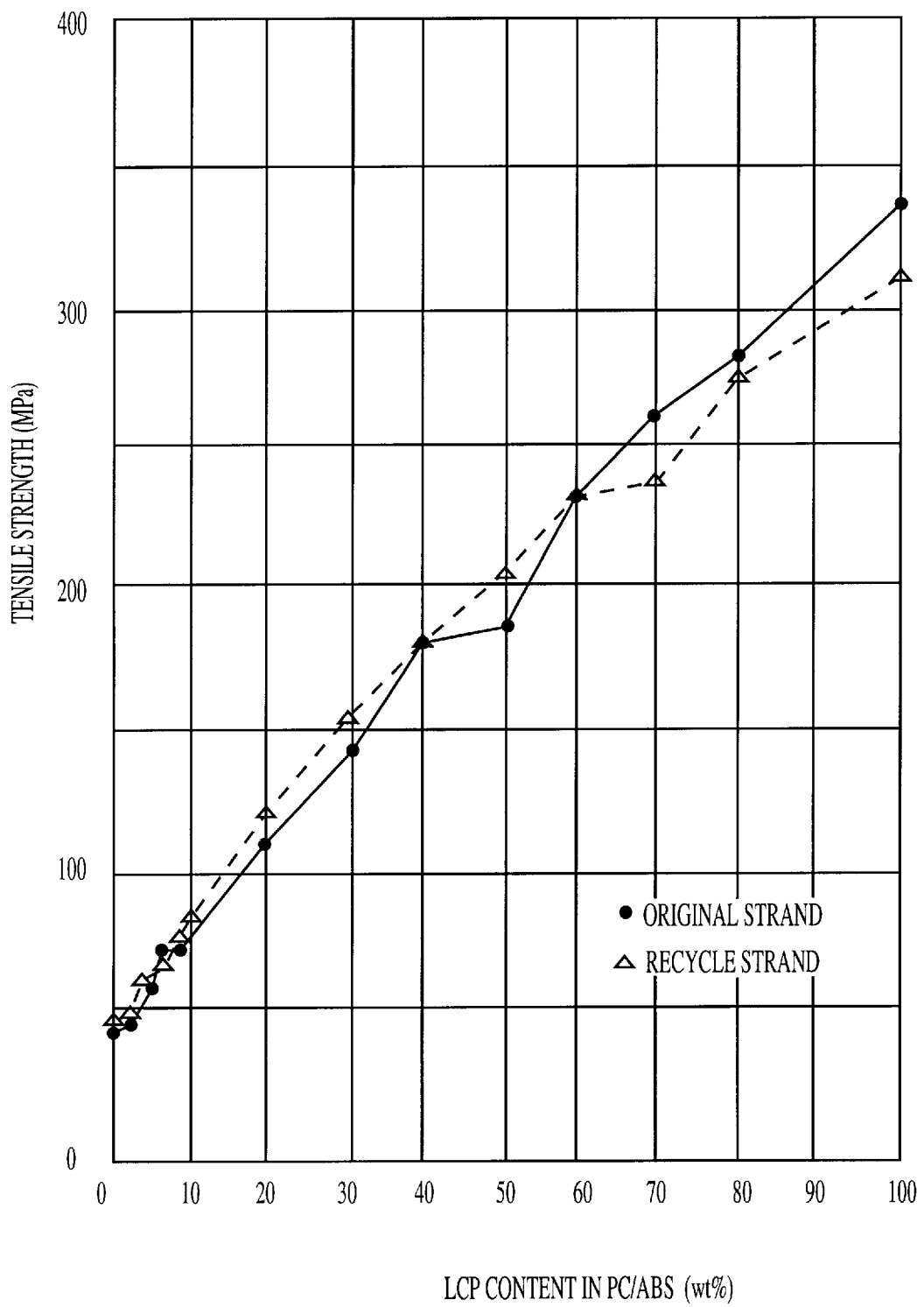
FIG. 8 is a graph showing a relationship between an amount(wt. %) of the liquid crystal polymer and a tensile strength of the original sample and the recycled sample in the case of PC/ABS.
Figure 9:
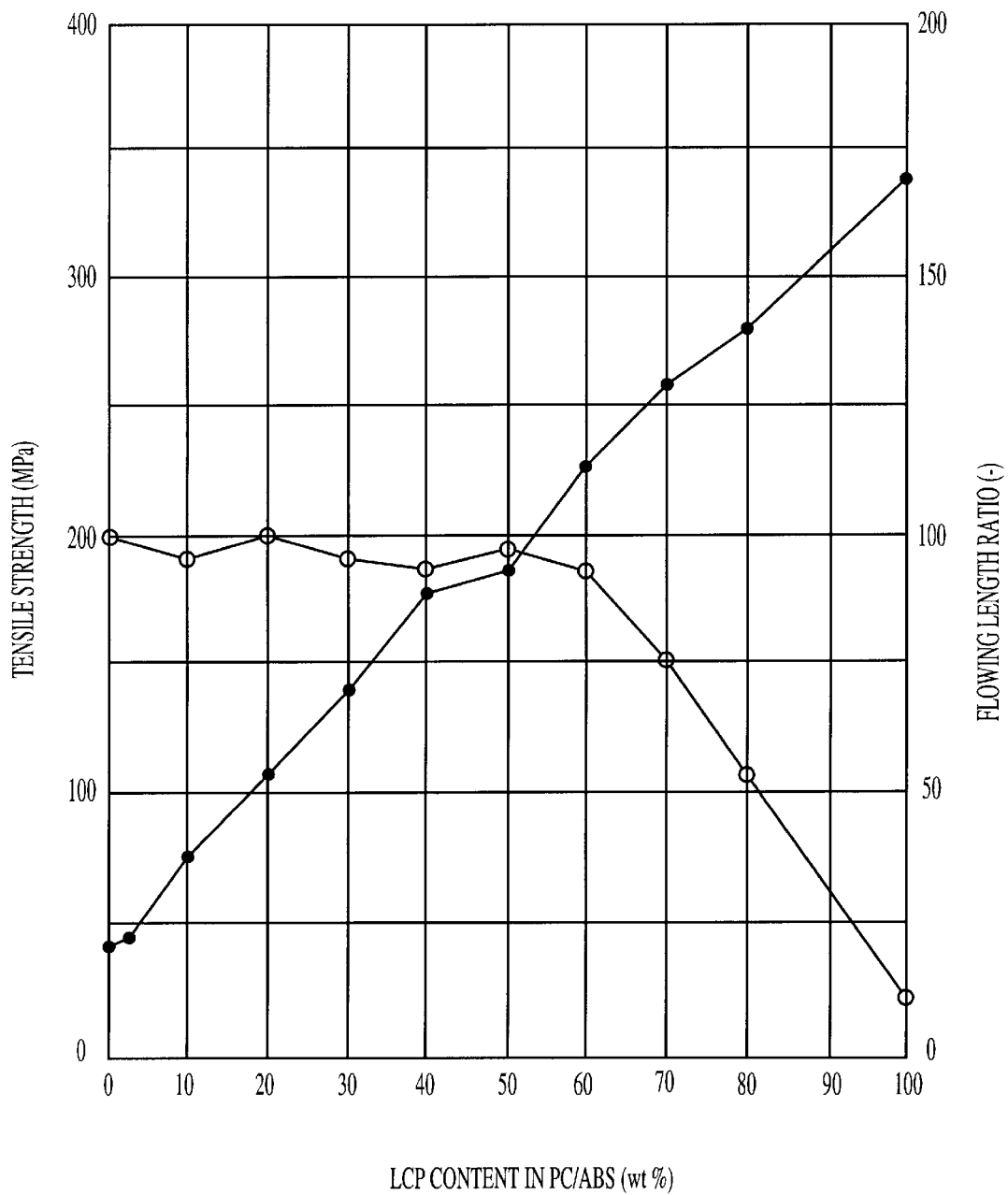
FIG. 9 is a graph showing a relationship between an amount(wt. %) of the liquid crystal polymer and a tensile strength and a flowing length ratio(-) in the case of PC/ABS.
Figure 10:
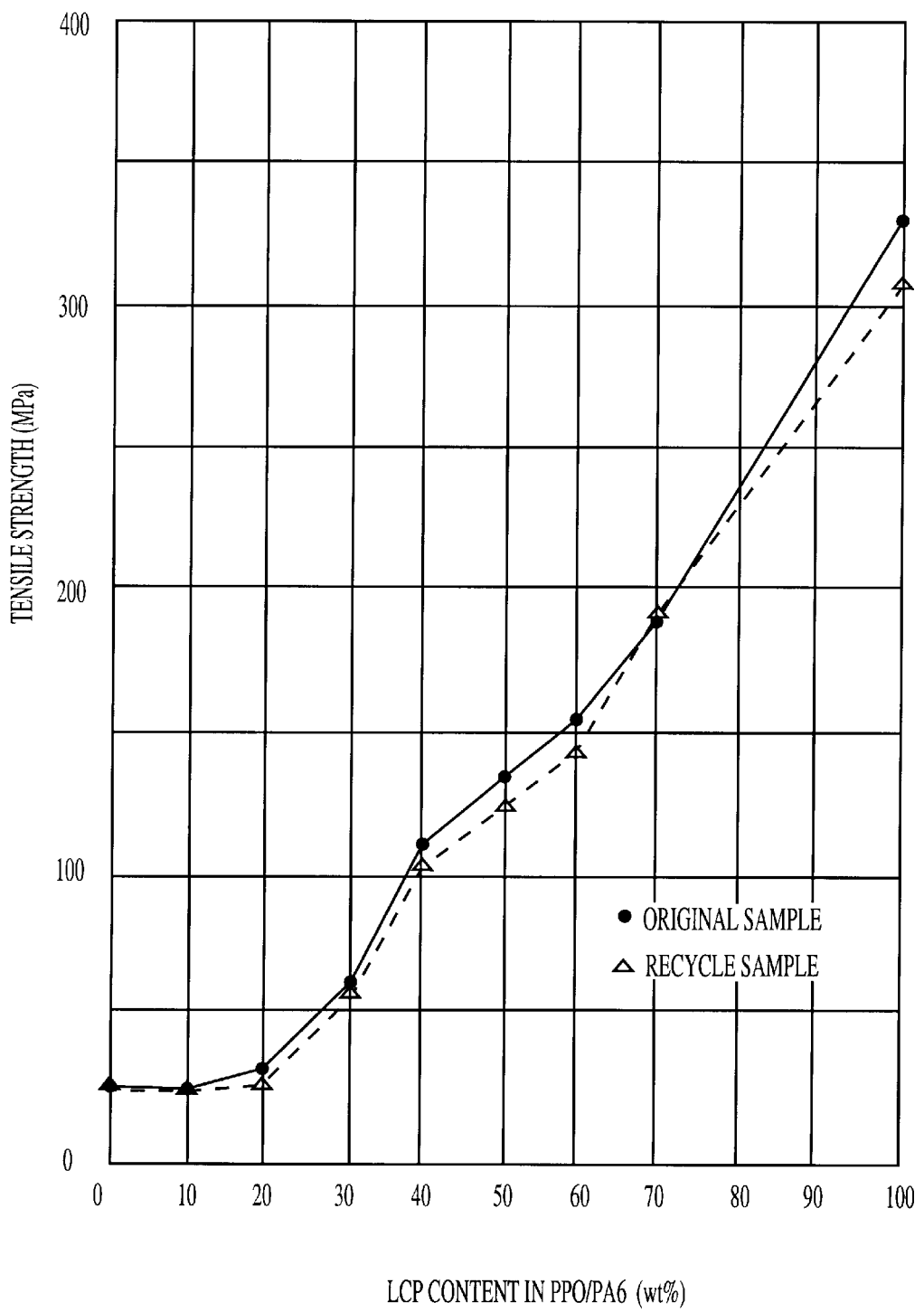
FIG. 10 is a graph showing a relationship between an amount(wt. %) of the liquid crystal polymer and a tensile strength of the original sample and the recycled sample in the case of PPO/PA6.
Figure 11:
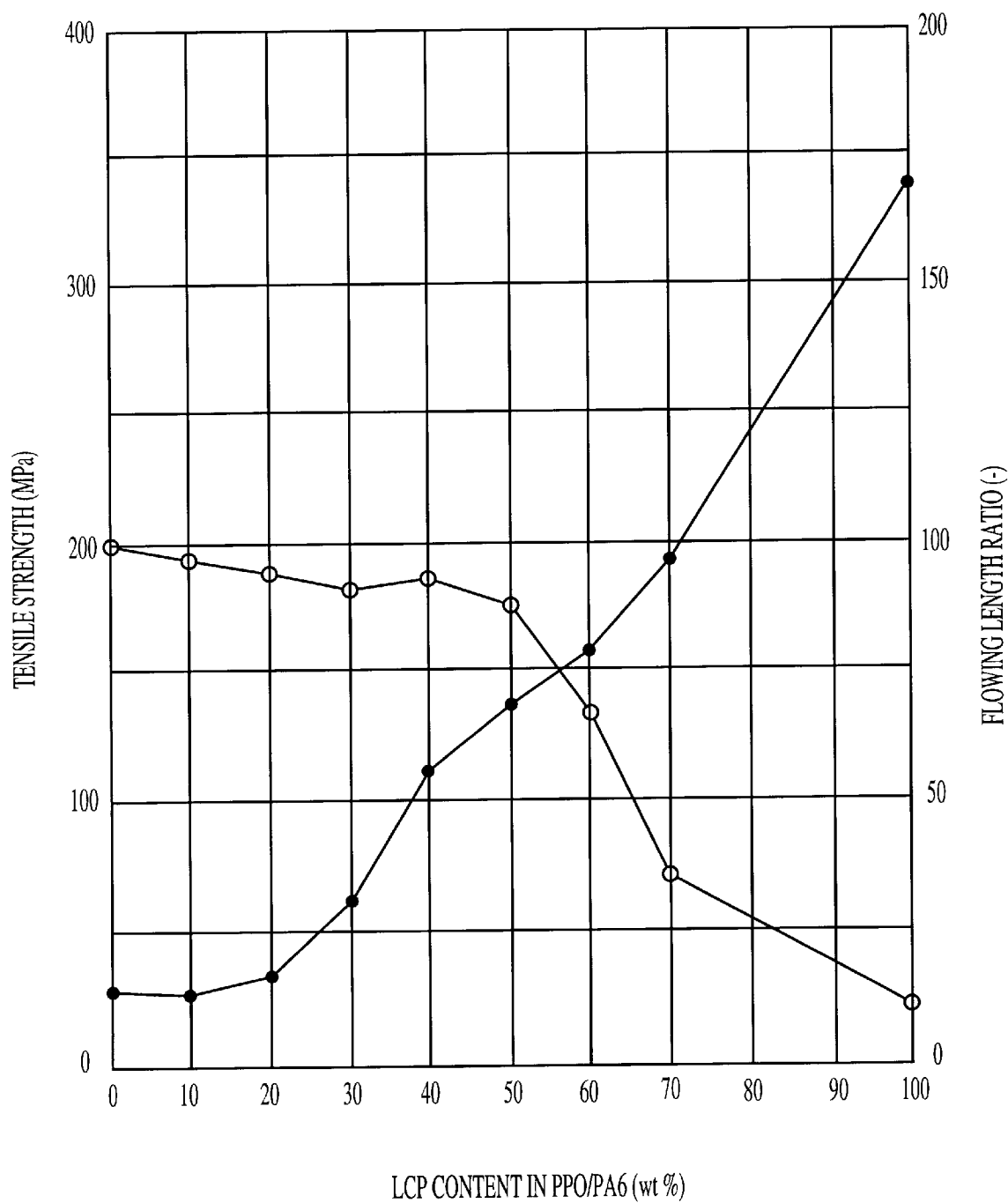
FIG. 11 is a graph showing a relationship between an amount(wt. %) of the liquid crystal polymer and a tensile strength and a flowing length ratio(-) in the case of PPO/PA6.
Figure 12:
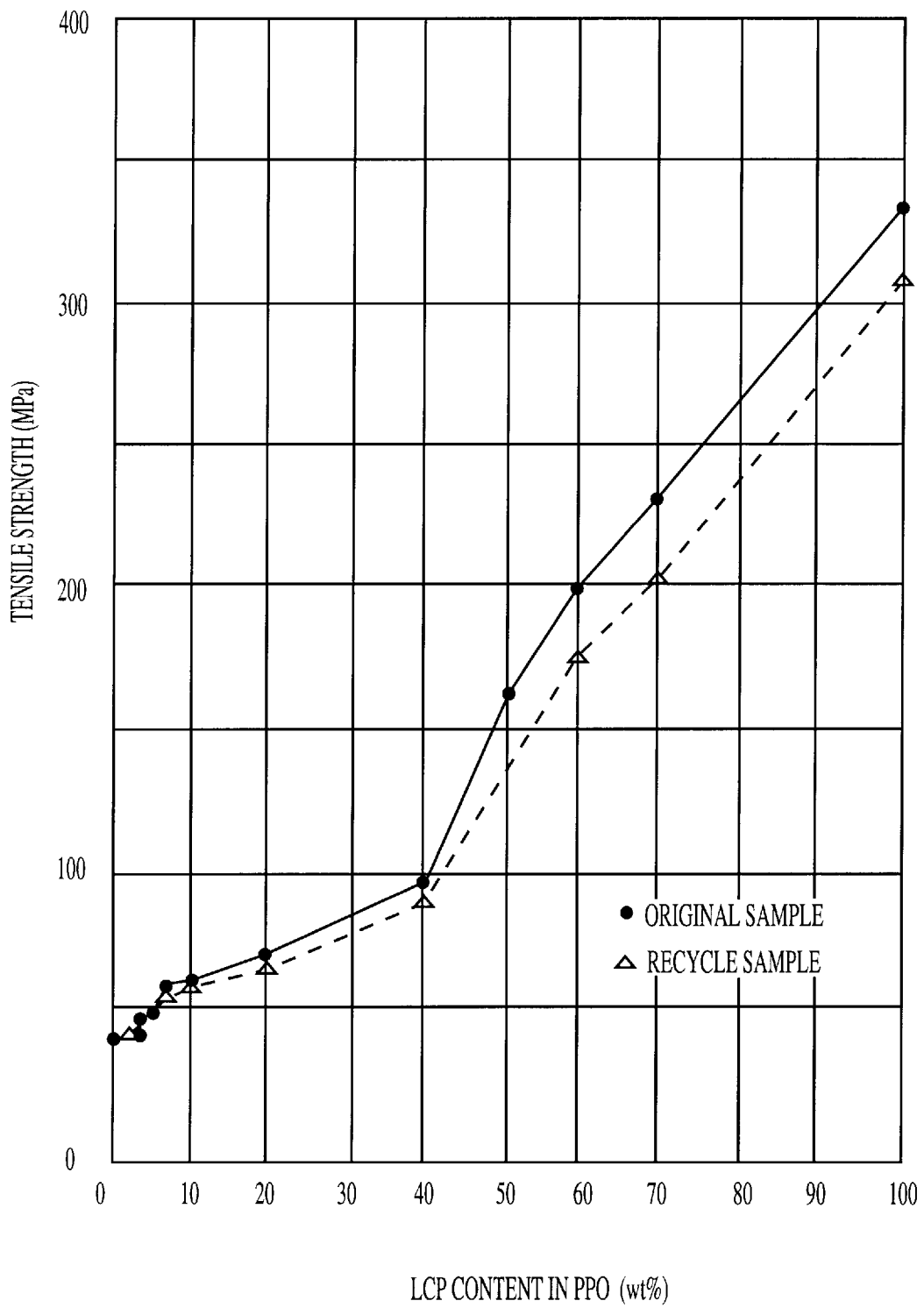
FIG. 12 is a graph showing a relationship between an amount(wt. %) of the liquid crystal polymer and a tensile strength of the original sample and the recycled sample in the case of the modified PPO.
Figure 13:
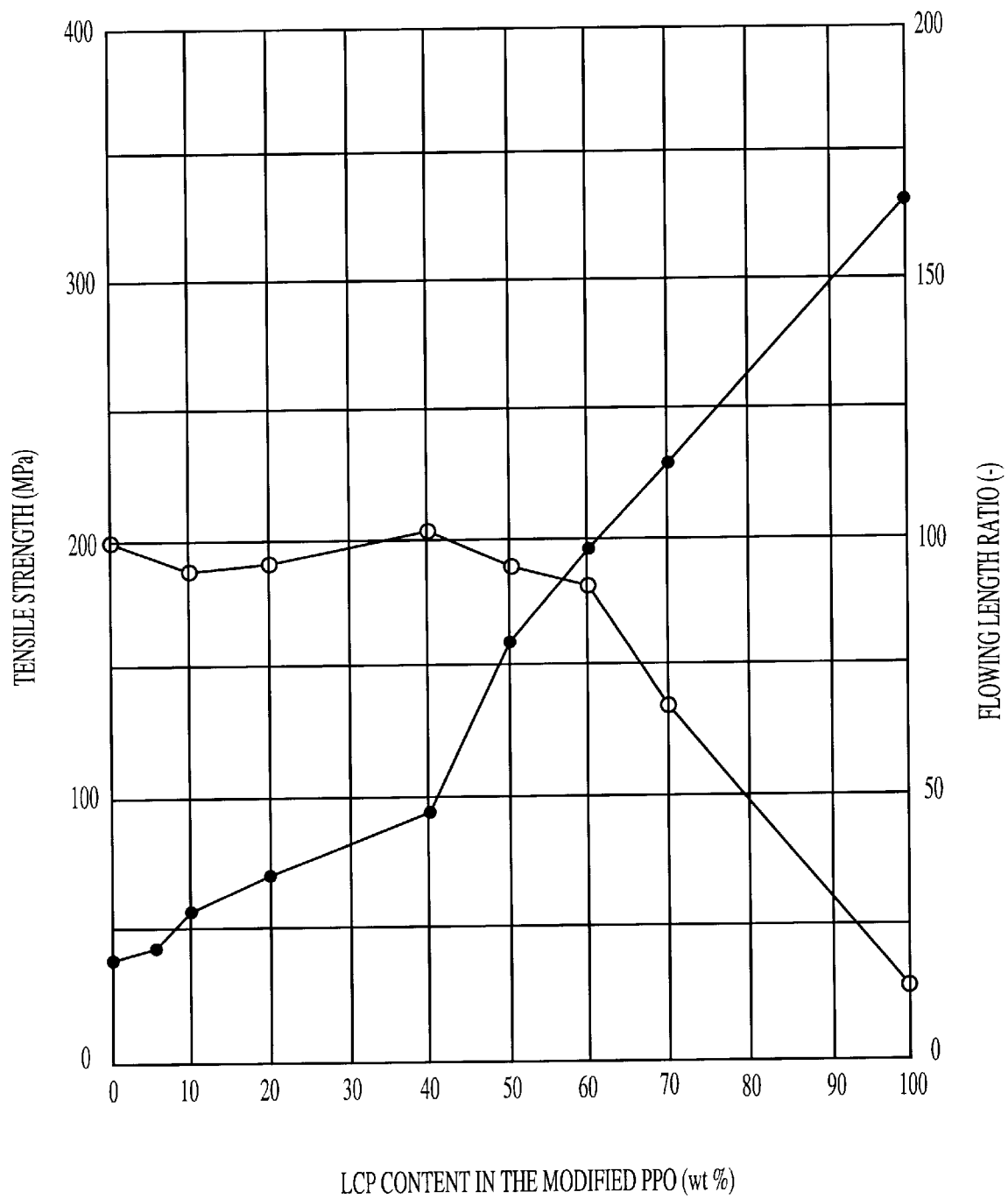
FIG. 13 is a graph showing a relationship between an amount(wt. %) of the liquid crystal polymer and a tensile strength and a flowing length ratio(-) in the case of the modified PPO.
Figure 14:
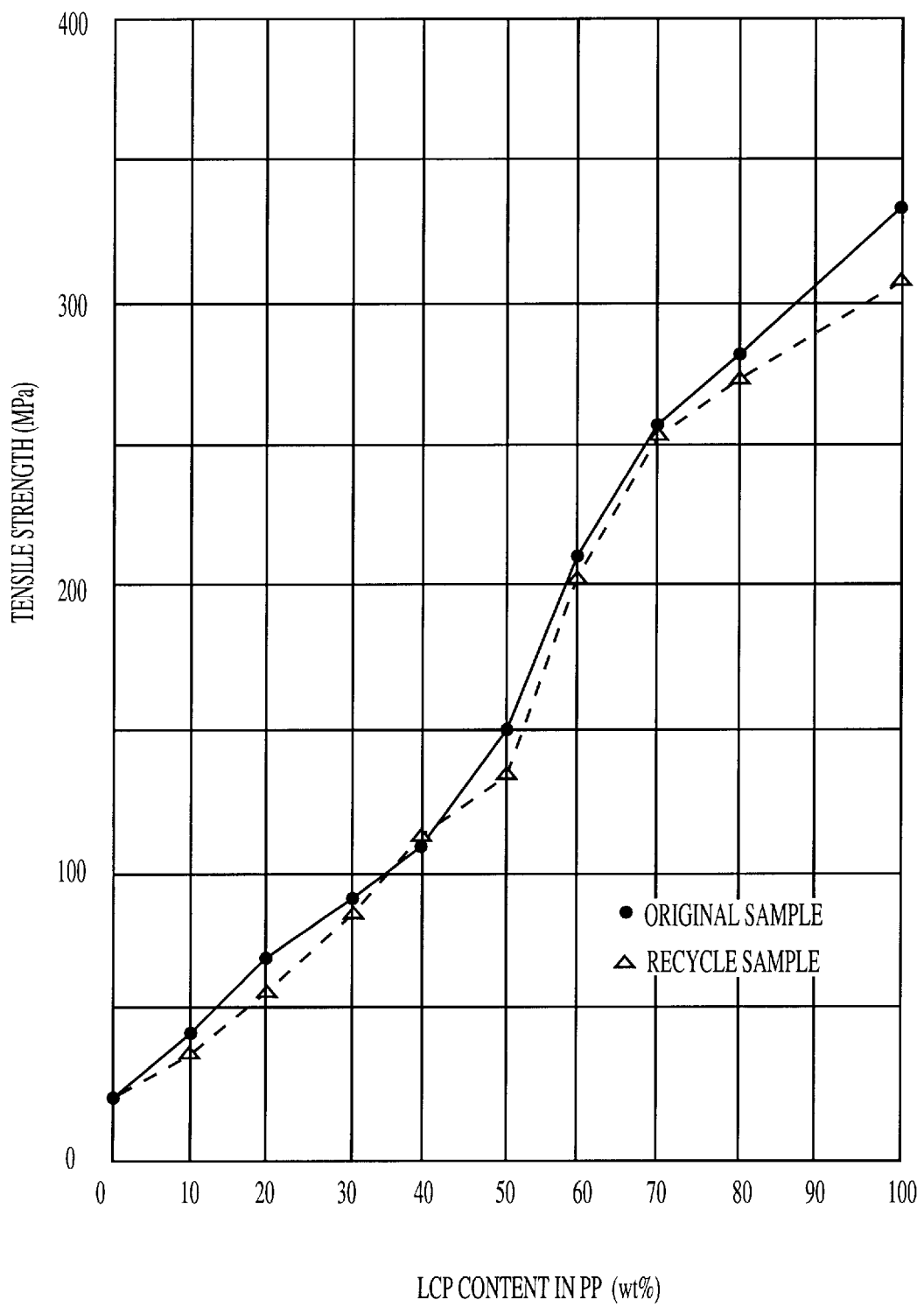
FIG. 14 is a graph showing a relationship between an amount(wt. %) of the liquid crystal polymer and a tensile strength of the original sample and the recycled sample in the case of PP.
Figure 15:
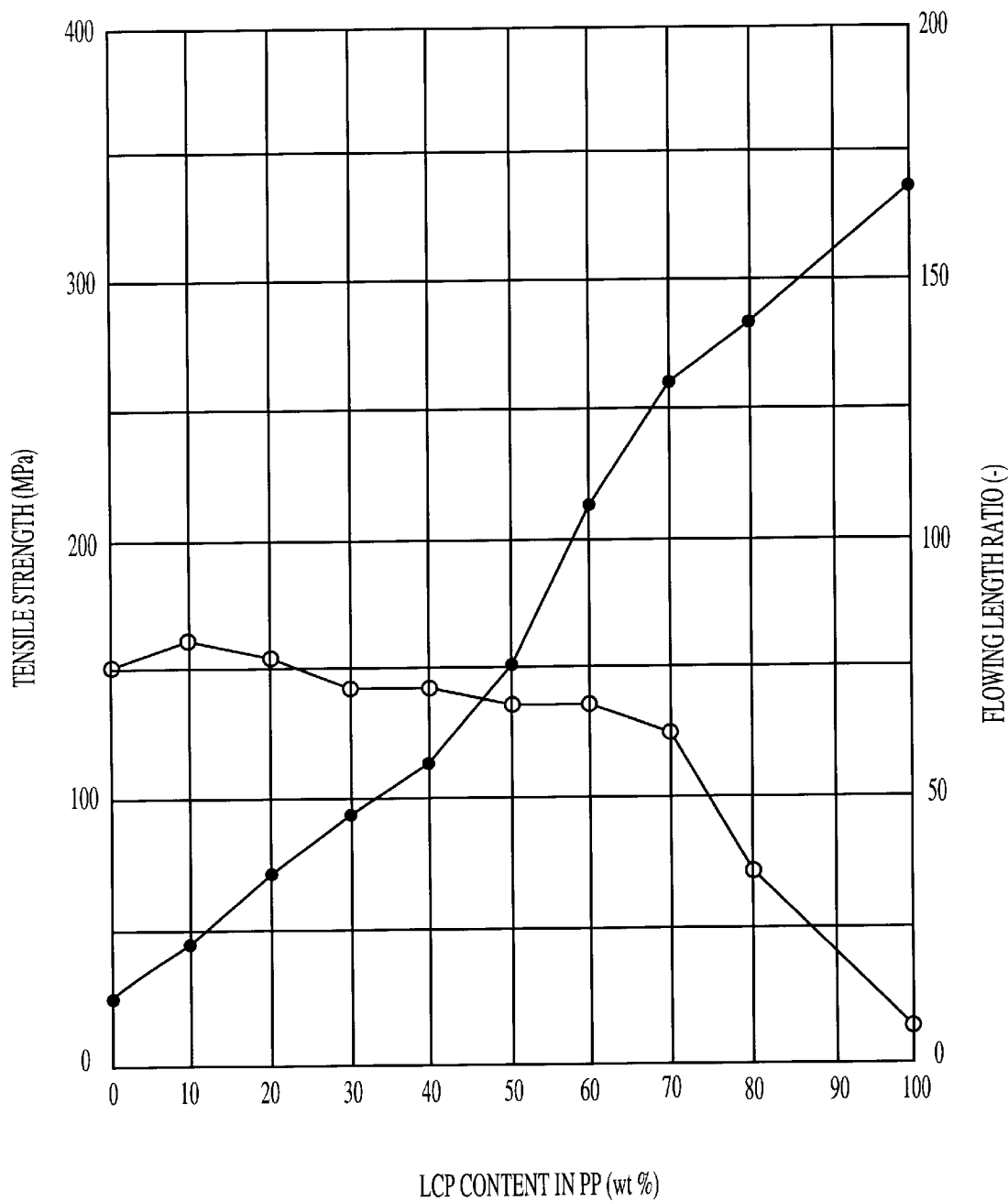
FIG. 15 is a graph showing a relationship between an amount(wt. %) of the liquid crystal polymer and a tensile strength and a flowing length ratio(-) in the case of PP.
Figure 16:
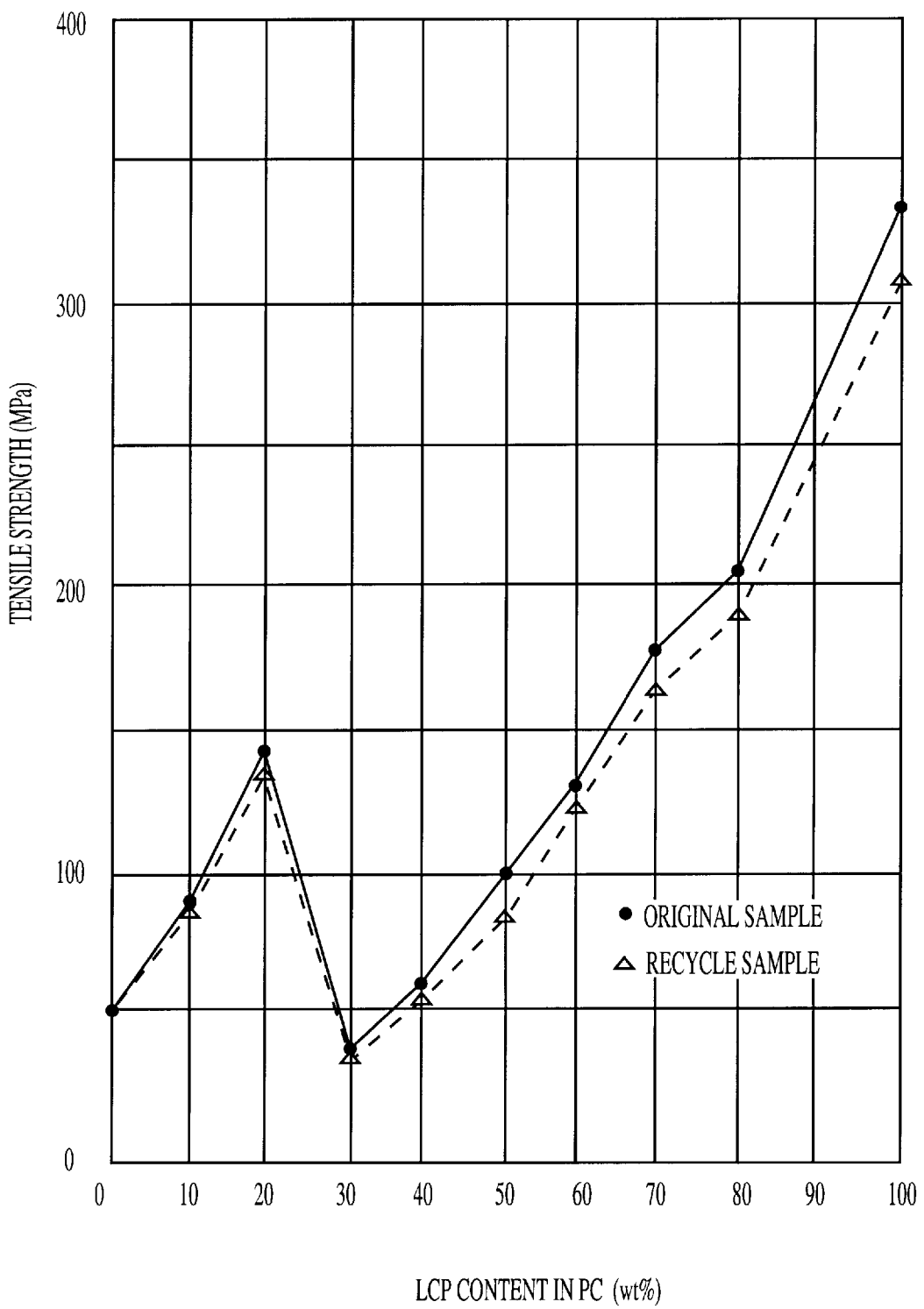
FIG. 16 is a graph showing a relationship between an amount(wt. %) of the liquid crystal polymer and a tensile strength of the original sample and the recycled sample in the case of PC.
Figure 17:
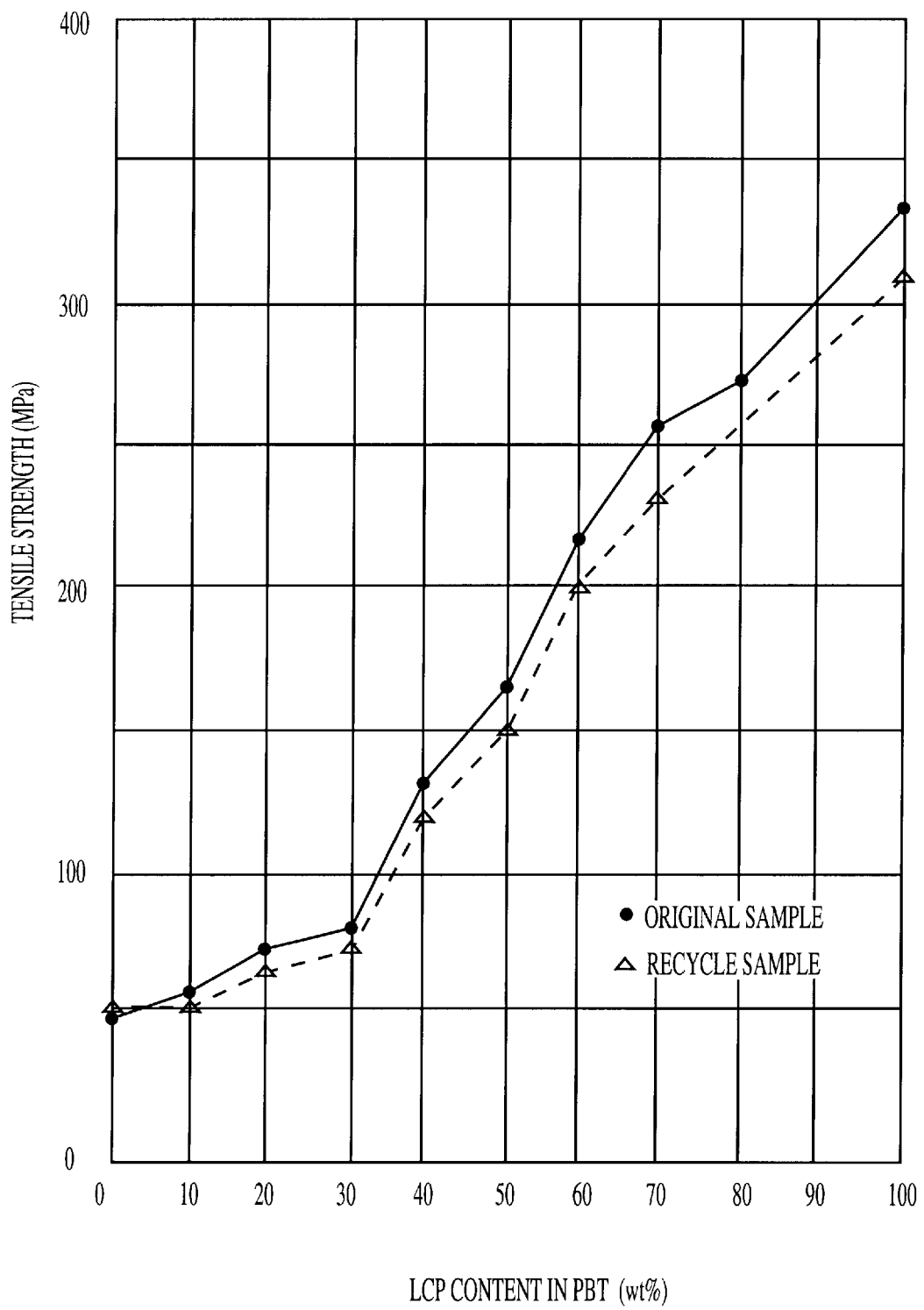
FIG. 17 is a graph showing a relationship between an amount(wt. %) of the liquid crystal polymer and a tensile strength of the original sample and the recycled sample in the case of PBT.
Figure 18:
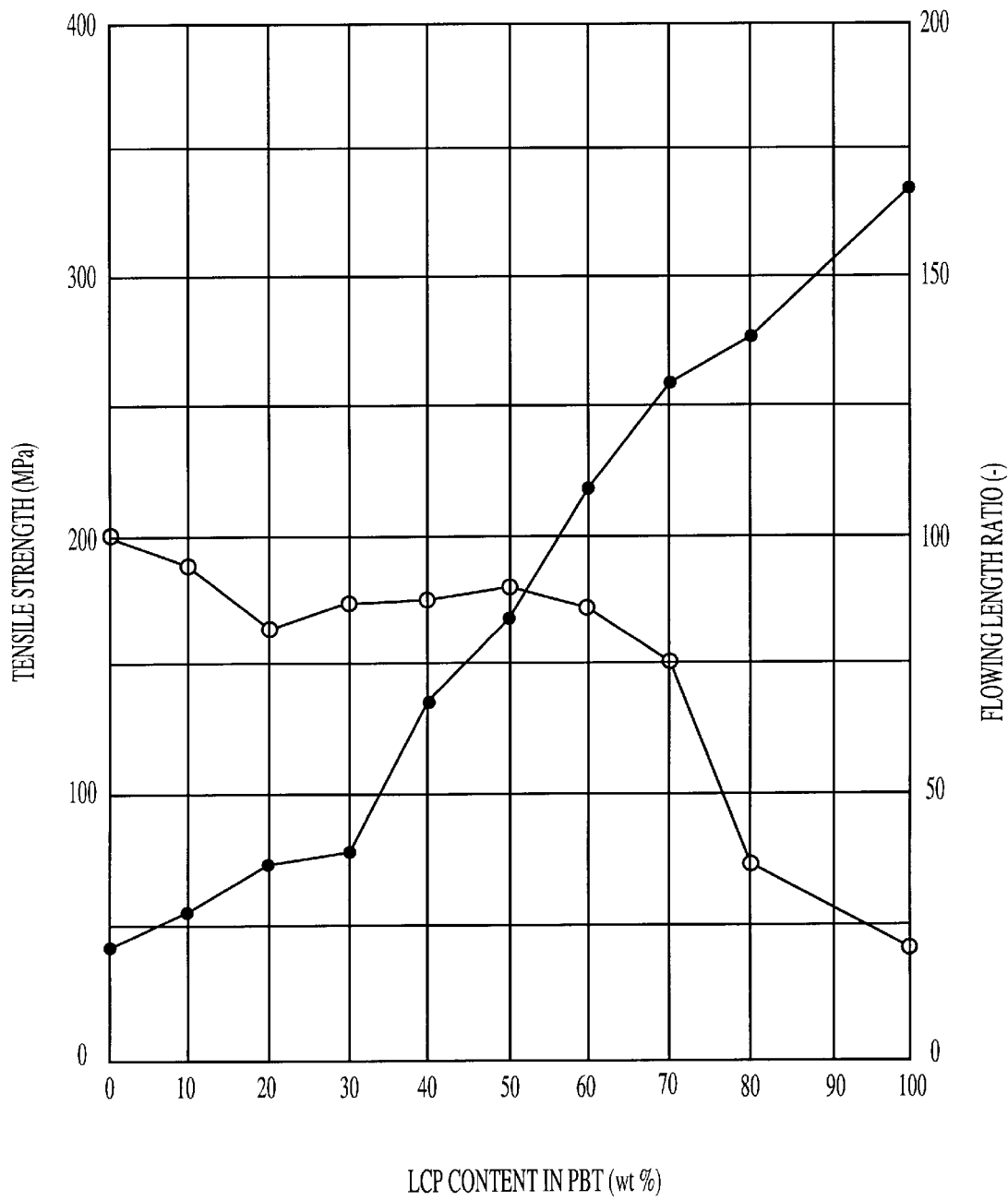
FIG. 18 is a graph showing a relationship between an amount(wt. %) of the liquid crystal polymer and a tensile strength and a flowing length ratio(-) in the case of PBT.
Figure 19:
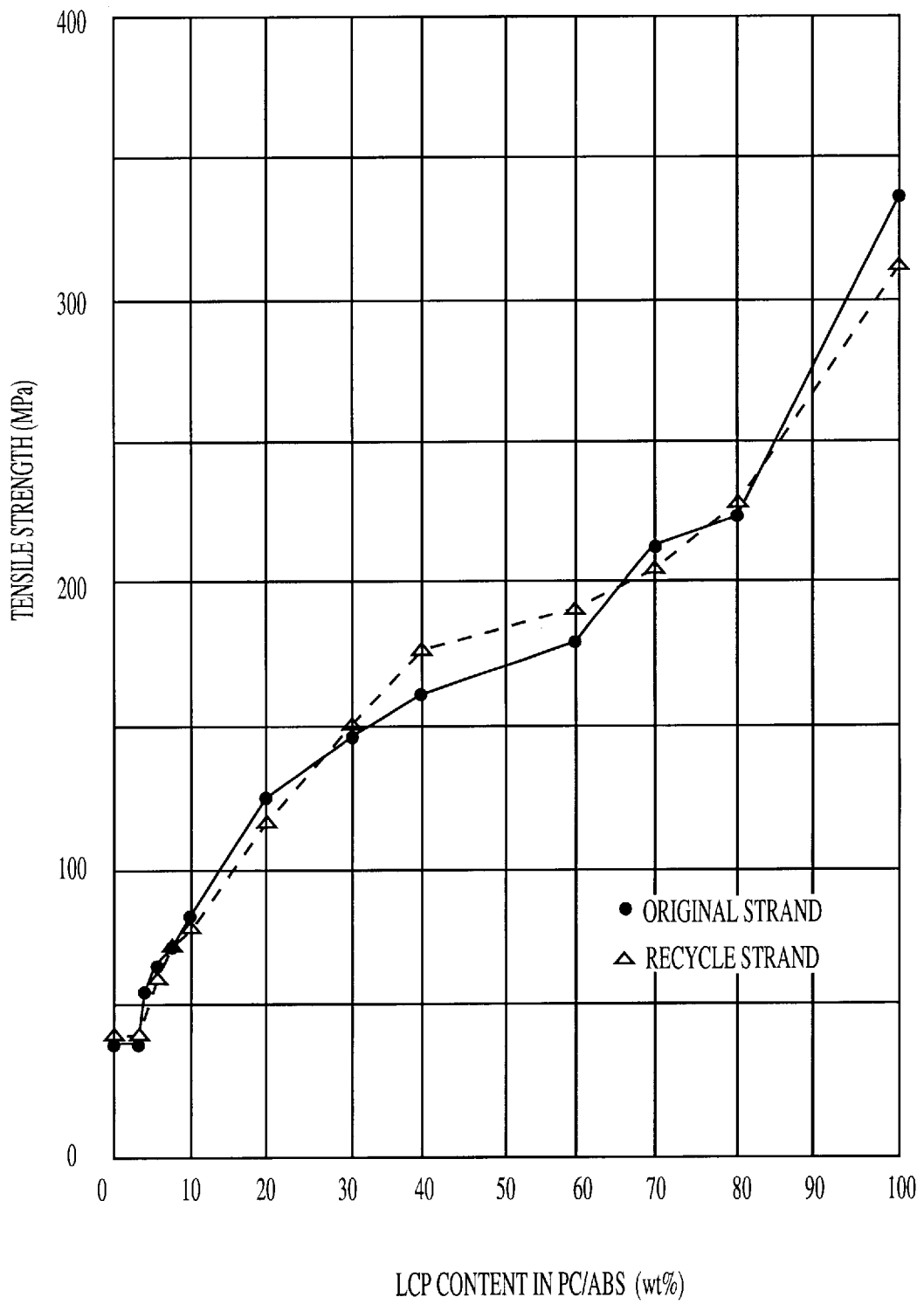
FIG. 19 is a graph showing a relationship between an amount(wt. %) of the liquid crystal polymer and a tensile strength of the original sample and the recycled sample in the case of PC/PBT.
Figure 20:
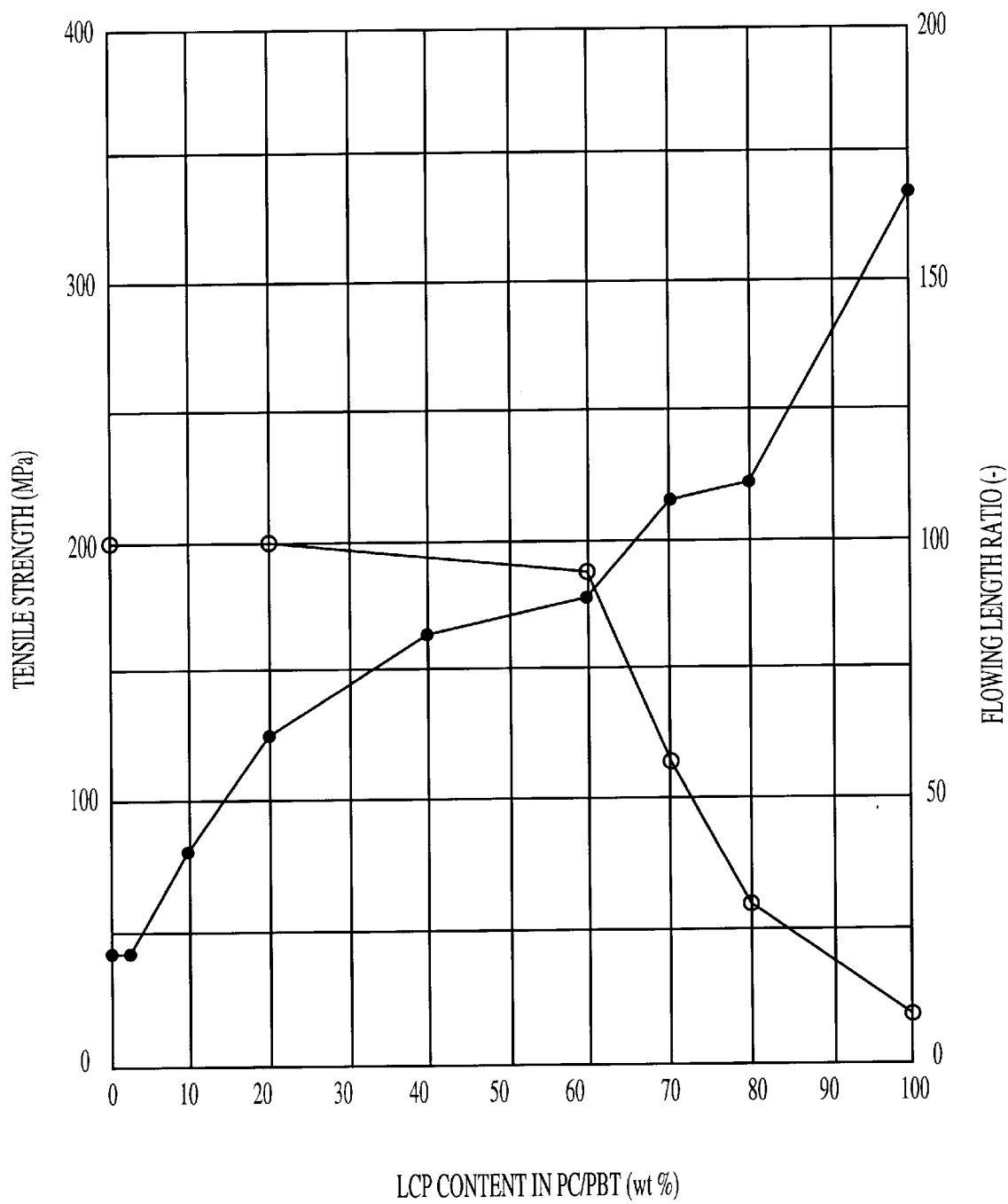
FIG. 20 is a graph showing a relationship between an amount(wt. %) of the liquid crystal polymer and a tensile strength and a flowing length ratio(-) in the case of PC/PBT.

The following description will be directed to the preferred embodiment of the present invention with reference to FIGS. 4 and 5.

EXAMPLE 1

A liquid crystal polymer as a starting material comprising VECTRA A 950 (aromatic polyester; liquid crystal transition temp. about 280° C.; made by POLYPLASTIC CO.) and a matrix thermoplastic resin comprising 1013B (Nylon-6; made by UBE INDUSTRIES,LTD.) were mixed in a given mixture ratio to give a liquid crystal polymer mixture.

Next, the resin mixture is subjected to a primary extrusion molding. The molding is carried out in the following conditions: an extruding apparatus is a two axis extruder (screw diameter: 36 mm; made by PLASTIC TECHNOLOGY INSTITUTE CO.); a resin temp. is 290° C.; a screw rotation is 100 rpm; die diameter is 2 mm; shear rate is 1700 sec$^{-1}$ and a drawing ratio is 2 times. The resin mixture is melt-extruded while being drawn into a first molding material of a strand form in a diameter of 1.4 mm and thereafter cut into a first pellet material of 3 mm in length.

Next, the first pellet material is subjected to an injection molding to give a liquid crystal polymer composite. The injection molding is carried out in the following condition: Injecting apparatus of 220 ton made by TOSHIBA KIKAI CO.; Die is a test piece type; Resin temp. is 250° C.

In this case, a flowing ability is tested by using the above injecting apparatus and a spiral flow type die (diameter; 6 mm of semicircle) at the resin temperature of 250° C. under an injecting pressure of 1000 kg/cm$^2$.

On the other hand, the injected resin composite is crushed into pellets of 3 to 4 mm in length by means of a crushing apparatus V-360 made by HORAI CO. The pellets are melt-extruded into a strand material of 1.4 mm in diameter for recycle test and cut into pellets of 3 mm in length. The extrusion molding condition is the same as that of the primary extrusion molding.

The strands of the first molding material and the recycled molding material were subjected to a tension testing by Universal Testing Machine AUTO GRAPH made by SHIMAZU CO. under a tensile rate of 20 mm/min.

FIG. 4 shows a result of the tension testing for the first molding material and the recycled molding material, wherein the LCP can be fiber formed in a range beyond 40% content thereof and substantially the same tensile strength of the above two materials is observed over the entire content range of the LCP. Therefore, it was confirmed that the tensile strength is not lowered by remolding.

On the other hand, FIG. 5 shows the relationship between a LCP content in the matrix resin and a flowing length ratio, wherein when the LCP content is beyond 80%, the fluidity lowers so remarkably that the material is not diffucult to use as a formable material. Therefore, as a result of the above consideration, in the case of using Nylon-6 as the matrix resin, the LCP content is preferably in a range from 40% to 80%, more preferably in a range from 50 to 75%.

Further, the two materials were subjected to an observation of configuration by means of an electron microscope. As a result, at 40% content of LCP, most parts of the LCP are in a granular shape part of the LCP is in a fiber shape. At 50% content of the LCP, most parts of the LCP are in a fiber shape. Therefore, it is understood that more than 40% of the LCP in the matrix resin makes it fiber formed and thus results in an improvement of tensile strength.

Considering that, Composite Sample A containing 70% of the LCP was prepared by melt-extruding and is added with a matrix resin PA-6 in a way to have a mixture ratio having 30% of the LCP. The resin mixture is subjected to injection molding to give Composite Sample B.

After crushing Sample B into pellets, the Sample B was mixed with fresh LCP pellets in such a way as to have a mixture ratio having 70% of the LCP and the resin mixture is subjected to an injection molding under the same conditions as the primary condition to give Composite Sample C. The Sample C is added with the matrix resin PA-6 in a way to have a mixture ratio having 30% of the LCP and the resin mixture is subjected to injection molding under the same conditions as the primary condition to give Composite Sample D.

The four Samples were subjected to tension testing and the tensile strength of each was measured. The result is indicated as follows:

TABLE 1

| Sample | A | B | C | D |
|---|---|---|---|---|
| Tensile Strength | 180 Mpa | 75 MPa | 170 MPa | 73 MPa |
| Shape | strand | product | strand | product |

On the other hand, the resin mixture containing 30% of the LCP is directly formed into a resin composite by melt-extruding for comparing the tensile strength to that of the four Samples. The reference composite has only 35 MPa of the tensile strength. The reason is that 30% of the LCP is out of the fiber formable range and results in non-fiber formed molding of the reference composite. Contrary to this, according to the present invention, even if the content of the LCP is out of the fiber formable range, the fiber formed LCP can be made to be dispersed in the matrix resin so that the desired tensile strength is provided to the resultant composite product.

EXAMPLE 2

Composite Sample E containing 60% of VECTRA A 950 as the LCP and 40% of ABS resin (KRALASTIC MH made by SUMITOMO DOW LTD.) was prepared by melt-extruding in the same condition as EXAMPLE 1 and is added with a matrix ABS resin in a way to have a mixture ratio having 20% of the LCP. The resin mixture is subjected to injection molding to give Composite Sample F.

After crushing Sample F into pellets, the Sample F was mixed with fresh LCP pellets in such a way as to have a mixture ratio having 60% of the LCP and the resin mixture is subjected to injection molding under the same conditions as the primary condition to give Composite Sample G. Sample G is added to the matrix ABS resin in a way to have a mixture ratio having 20% of the LCP and the resin mixture is subjected to injection molding under the same conditions as the primary condition to give Composite Sample H.

The four Sample were subjected to tension testing and the tensile of each strength was measured. The result is indicated as follows:

TABLE 2

| Sample | E | F | G | H |
|---|---|---|---|---|
| Tensile Strength | 154 Mpa | 63 MPa | 148 MPa | 60 MPa |
| Shape | strand | product | strand | product |

On the other hand, the resin mixture containing 20% of the LCP is directly formed into a resin composite by melt-extruding for comparing the tensile strength to that of the four Samples. The reference composite has only 50 MPa of the tensile strength.

EXAMPLE 3

Composite Sample I containing 40% of VECTRA A 950 as the LCP and 60% of PPO/PA6 resin (NORYL GTX 6006 made by GE PLASTICS JAPAN LTD.) was prepared by melt-extruding in the same condition as EXAMPLE 1 and is added with a matrix PPO/PA6 resin in a way to have a mixture ratio having 10% of the LCP. The resin mixture is subjected to an injection molding (molding temp. 260° C.) to give Composite Sample J.

After crushing Sample J into pellets, Sample J was mixed with fresh LCP pellets in such a way as to have a mixture ratio having 40% of the LCP and the resin mixture is subjected to injection molding under the same conditions as the primary condition to give Composite Sample K. Sample K is combined with the matrix PPO/PA6 resin in such a way as to have a mixture ratio having 10% of the LCP and the resin mixture is subjected to injection molding under the same conditions as the primary condition to give Composite Sample L.

The four Sample were subjected to a tension testing and the tensile strength of each was measured. The result is indicated as follows:

TABLE 3

| Sample | I | J | K | L |
|---|---|---|---|---|
| Tensile Strength | 110 Mpa | 54 MPa | 105 MPa | 52 MPa |
| Shape | strand | product | strand | product |

On the other hand, the resin mixture containing 10% of the LCP is directly formed into a resin composite by melt-extruding for comparing the tensile strength to that of the four Samples. The reference composite has only 40 MPa of the tensile strength.

What is claimed is:

1. A method for forming a second liquid crystal resin composite from a first liquid crystal resin composite, said second liquid crystal resin composite comprising:
    (i) a thermoplastic resin as a matrix having at least one melting temperature or glass transition temperature and
    (ii) a liquid crystal resin as a reinforcement material having a liquid crystal transition temperature higher than any of the melting temperature or glass transition temperatures of said thermoplastic resin, comprising the following sequential steps:
        (a) melt-processing a first mixture of said liquid crystal liquid resin and said thermoplastic resin at a temperature which is higher than the liquid crystal transition temperature of said liquid crystal resin to produce said first liquid crystal resin composite, said first mixture having a mixture ratio of said liquid crystal resin to said thermoplastic resin which is within a fiber formable range wherein it is possible to form uniformly dispersed fibers having an aspect ratio of 3 or more of said liquid crystal resin in situ in the matrix of said first liquid crystal resin composite during said melt-processing,
        (b) adding additional thermoplastic resin to said melt-processed first mixture formed in step (a) to make a second mixture, said second mixture having a mixture ratio of the total content of said liquid crystal resin to the total content of said thermoplastic resin below said fiber formable range of said first mixture in step (a), and
        (c) forming said second liquid crystal resin composite by melt-processing said second mixture at a temperature which is at or higher than any of the melting temperature or glass transition temperature of said thermoplastic resin and lower than the liquid crystal transition temperature of said liquid crystal resin, said second liquid crystal resin composite having fibers of said liquid crystal resin of aspect ratio of 3 or more dispersed uniformly therethrough, said second mixture having a mixture ratio of the total content of said liquid crystal resin to the total content of said thermoplastic resin below said fiber formable range of said first mixture in step (a).

2. The method of according to claim 1, wherein said thermoplastic resin is an ABS resin and the fiber formable range of said liquid crystal resin in said first liquid crystal resin composite is from 40 wt. % to 70 wt. % liquid crystal resin based on the weight of said first liquid crystal resin composite and said second liquid crystal resin composite contains less then 40 wt. % of said liquid crystal resin based on the total weight of said second liquid crystal resin composite.

3. The method according to claim 1, wherein said thermoplastic resin is a PA(polyamide) resin and the fiber formable range of said liquid crystal resin in said first liquid crystal resin composite is from 50 wt. % to 70 wt. % liquid crystal resin based on the weight of said first liquid crystal resin composite and said second liquid crystal resin composite contains less than 50 wt. % of said liquid crystal resin based on the total weight of said second liquid crystal resin composite.

4. The method according to claim 1, wherein said thermoplastic resin is a PC(polycarbonate)/ABS resin and the fiber formable range of said liquid crystal resin in said first liquid crystal resin composite is from 3 wt. % to 70 wt. % liquid crystal resin based on the weight of said first liquid crystal resin composite and said second liquid crystal resin composite contains less than 3 wt. % of said liquid crystal resin based on the total weight of said second liquid crystal resin composite.

5. The method according to claim 1, wherein said thermoplastic resin is a PPO/PA6(polyphenyleneoxide/Nylon) resin and the fiber formable range of said liquid crystal resin in said first liquid crystal resin composite is from 20 wt. % to 65 wt. % liquid crystal resin based on the weight of said first liquid crystal resin composite and said second liquid crystal resin composite contains less than 20 wt. % of said liquid crystal resin based on the total weight of said second liquid crystal resin composite.

6. The method according to claim 1, wherein said thermoplastic resin is a styrene modified PPO (polyphenyleneoxide) resin and the fiber formable range of said liquid crystal resin in said first liquid crystal resin composite is from 40 wt. % to 60 wt. % liquid crystal resin based on the weight of said first liquid crystal resin composite and said second liquid crystal resin composite contains less than 40 wt. % of said liquid crystal resin based on the total weight of said second liquid crystal resin composite.

7. The method according to claim 1, wherein said thermoplastic resin is a PP(polypropylene) resin and the fiber formable range of said liquid crystal resin in said first liquid crystal resin composite is from 40 wt. % to 70 wt. % liquid crystal resin based on the weight of said first liquid crystal resin composite and said second liquid crystal resin composite contains less than 40 wt. % of said liquid crystal resin based on the total weight of said second liquid crystal resin composite.

8. The method according to claim 1, wherein said thermoplastic resin is a PC(polycarbonate) resin and the fiber formable range of said liquid crystal resin in said first liquid crystal resin composite is from 3 wt. % to 20 wt. % liquid crystal resin based on the weight of said first liquid crystal resin composite and said second liquid crystal resin composite contains less than 3 wt. % of said liquid crystal resin based on the total weight of said second liquid crystal resin composite.

9. The method according to claim 1, wherein said thermoplastic resin is a PBT(polybutylene terephthalate) resin and the fiber formable range of said liquid crystal resin in said first liquid crystal resin composite is from 30 wt. % to 70 wt. % liquid crystal resin based on the weight of said first liquid crystal resin composite and said second liquid crystal resin composite contains less than 30 wt. % of said liquid crystal resin based on the total weight of said second liquid crystal resin composite.

10. The method according to claim 1, wherein said thermoplastic resin is a PC/PBT(polycarbonate/polybutylene terephthalate) resin and the fiber formable range of said liquid crystal resin in said first liquid crystal resin composite is from 2 wt. % to 60 wt. % liquid crystal resin based on the weight of said first liquid crystal resin composite and said second liquid crystal resin composite contains less than 2 wt. % of said liquid crystal resin based on the total weight of said second liquid crystal resin composite.

11. The method according to claim 1, wherein the fibers in said second liquid crystal resin composite have an aspect ratio of 10 or more.

12. The method according to claim 1, wherein said liquid crystal resin has a liquid crystal transition temperature which is at least 20° C. higher than any of the melting temperature or glass transition temperature of said thermoplastic resin.

13. The method according to claim 1, wherein said melt-processing is carried out at a shear rate between $3 \times 10^2$ and $3 \times 10^5$ sec$^{-1}$.

14. The method according to claim 1, wherein said melt-processing is carried out at a shear rate between $3 \times 10^2$ and $3 \times 10^4$ sec$^{-1}$.

15. The method according to claim 1, wherein said first or second mixture is processed by extrusion or injection molding.

* * * * *